US012451058B2

(12) United States Patent
Song et al.

(10) Patent No.: US 12,451,058 B2
(45) Date of Patent: Oct. 21, 2025

(54) DISPLAY APPARATUS INCLUDING DISPLAY PANEL HAVING ACTIVE AREA WITH SUB PIXELS AND MODE CONTROLLER DISPOSED IN ACTIVE AREA THAT SUPPLIES MODE SIGNAL TO THE SUB PIXELS

(71) Applicant: LG Display Co., Ltd., Seoul (KR)

(72) Inventors: SangMoo Song, Seoul (KR); Intae Ko, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/774,502

(22) Filed: Jul. 16, 2024

(65) Prior Publication Data

US 2025/0061843 A1 Feb. 20, 2025

(30) Foreign Application Priority Data

Aug. 14, 2023 (KR) ........................ 10-2023-0106377

(51) Int. Cl.
*G09G 3/30* (2006.01)
*G09G 3/32* (2016.01)

(52) U.S. Cl.
CPC ....... *G09G 3/32* (2013.01); *G09G 2300/0426* (2013.01); *G09G 2300/0443* (2013.01); *G09G 2320/028* (2013.01); *G09G 2320/068* (2013.01); *G09G 2380/10* (2013.01)

(58) Field of Classification Search
CPC ......... G09G 3/30-32; G09G 2320/028; G09G 2320/068; G09G 2300/0809
See application file for complete search history.

(56) References Cited

U.S. PATENT DOCUMENTS

2006/0109224 A1* 5/2006 Chang .................. G09G 3/3648 345/89
2011/0284881 A1* 11/2011 Shikina ................ H10K 59/879 257/E27.121
2012/0127064 A1* 5/2012 Kawano ............... G09G 3/3225 345/76
2015/0048333 A1* 2/2015 Choi .................... H10K 59/879 257/40
2018/0122292 A1* 5/2018 Ju ........................ G09G 3/2092
2022/0158135 A1* 5/2022 Irobe .................... H10H 20/855
2022/0320386 A1* 10/2022 Sun ...................... H10H 20/855

FOREIGN PATENT DOCUMENTS

KR 10-2021-0080781 A 7/2021
KR 10-2022-0165958 A 12/2022

* cited by examiner

*Primary Examiner* — Sanghyuk Park
(74) *Attorney, Agent, or Firm* — Seed Intellectual Property Law Group LLP

(57) ABSTRACT

A display panel including an active area in which a plurality of pixels including a plurality of sub pixels is disposed and a non-active area disposed so as to enclose the active area and a mode controller which is disposed in the active area and which supplies a mode signal to the plurality of sub pixels, wherein each of the plurality of sub pixels includes a first light emitting diode, a first lens which refracts light from the first light emitting diode, a second light emitting diode which emits a same color light as the first light emitting diode and a second lens which refracts light from the second light emitting diode and has a shape different from a shape of the first lens.

18 Claims, 19 Drawing Sheets

DISPLAY APPARATUS INCLUDING DISPLAY PANEL HAVING ACTIVE AREA WITH SUB PIXELS AND MODE CONTROLLER DISPOSED IN ACTIVE AREA THAT SUPPLIES MODE SIGNAL TO THE SUB PIXELS

CROSS-REFERENCE TO RELATED APPLICATIONS

This application claims the priority of Korean Patent Application No. 10-2023-0106377 filed on Aug. 14, 2023, in the Korean Intellectual Property Office, the disclosure of which is incorporated herein by reference.

BACKGROUND

Technical Field

The present disclosure relates to a display apparatus, and more particularly, to a display apparatus which is capable of controlling a viewing angle.

Description of the Related Art

As technology in modern society develops, display apparatuses are used in various ways to provide information to users. The display apparatuses include not only electronic signs which simply transmit visual information in one direction, but also various electronic devices which require a higher level of technology to check a user's input and provide information in response to the checked input.

For example, a display apparatus is included in a vehicle to provide various information to a driver and passengers of the vehicle. However, the display apparatus of the vehicle needs to appropriately display contents without interrupting the operation of the vehicle. For example, the display apparatus needs to limit the display of the contents which may reduce the concentration on driving while the vehicle is in operation.

BRIEF SUMMARY

Embodiments of the present disclosure provide a display apparatus which freely and selectively limits a viewing angle for each of a plurality of areas of a plurality of active areas of a display panel.

Another object to be achieved by Embodiments of the present disclosure also provide a display apparatus which reduces a bezel.

Embodiments of the present disclosure further provide a display apparatus which improves a luminance uniformity for every position in an active area.

The present disclosure is not limited to the above-mentioned embodiments, and other embodiments, which are not mentioned above, can be clearly understood by those skilled in the art from the following descriptions.

In order to achieve the above, a display apparatus according to an exemplary embodiment of the present disclosure includes a display panel including an active area in which a plurality of pixels including a plurality of sub pixels is disposed and a non-active area which is disposed so as to enclose the active area and a mode controller which is disposed in the active area and which supplies a mode signal to the plurality of sub pixels, wherein each of the plurality of sub pixels includes a first light emitting diode, a first lens which refracts light from the first light emitting diode, a second light emitting diode which emits a same color light as the first light emitting diode and a second lens which refracts light from the second light emitting diode and has a shape different from a shape of the first lens.

In order to achieve the above, a display apparatus according to another exemplary embodiment of the present disclosure includes a display panel including an active area which is divided into a plurality of areas and a non-active area, a plurality of sub pixels disposed in the active area and driven in a wide-view mode or a narrow-view mode, and a mode controller disposed in the active area and including a wide-view mode controller providing a wide-view mode signal to the plurality of sub pixels and a narrow-view mode controller providing a narrow-view mode signal.

Other detailed matters of the exemplary embodiments are included in the detailed description and the drawings.

According to the present disclosure, a narrow-view mode and a wide-view mode are independently driven in each of a plurality of areas of a plurality of active areas to selectively limit the viewing angle in each of the plurality of active areas.

According to the present disclosure, a mode selecting unit is disposed in the active area to minimize a bezel area.

According to the present disclosure, a low potential power line is disposed in a partial area of a remaining area excluding an area in which a mode selecting unit is disposed to suppress a rising phenomenon of a low potential power.

According to the present disclosure, a luminance uniformity for every position in the active area may be improved.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
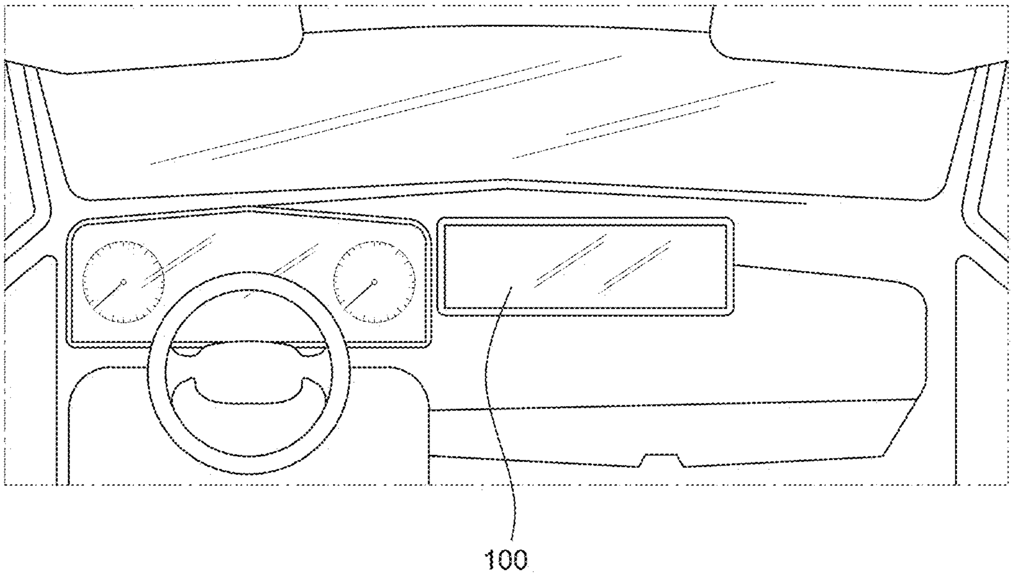
FIG. 1 is an example of a display apparatus according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise.

When the position relation between two parts is described using the terms such as "on", "above", "below", and "next", one or more parts may be positioned between the two parts unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

The features of various embodiments of the present disclosure can be partially or entirely adhered to or combined with each other and can be interlocked and operated in technically various ways, and the embodiments can be carried out independently of or in association with each other.

Hereinafter, exemplary embodiments of the present disclosure will be described in detail with reference to accompanying drawings.

FIG. 1 is an example of a display apparatus according to an exemplary embodiment of the present disclosure.

The display apparatus 100 may be disposed in at least a part of a dashboard of a vehicle. The dashboard of the vehicle includes a configuration disposed in front surfaces of front seats (for example, a driver seat and a front passenger seat) of the vehicle. For example, on the dashboard of the vehicle, an input configuration for manipulating various functions (for example, an air-conditioner, an audio system, or a navigation system) in the vehicle may be disposed.

A display apparatus 100 according to the exemplary embodiment of the present disclosure is disposed on the dashboard of the vehicle to operate as an input unit which manipulates at least a part of various functions of the vehicle. The display apparatus 100 may provide various information related to the vehicle, for example, operation information of the vehicle (for example, a current speed of the vehicle, a remaining fuel amount, or a mileage) or information about parts of the vehicle (for example, a damage level of a vehicle tire).

The display apparatus 100 is disposed across the driver seat and the front passenger seat disposed in the front seats of the vehicle. A user of the display apparatus 100 may include a driver of the vehicle and a passenger riding on the front passenger seat. Both the vehicle driver and the passenger may use the display apparatus 100.

Only a part of the display apparatus 100 is illustrated in FIG. 1. The display apparatus 100 illustrated in FIG. 1 may illustrate a display panel, among various configurations included in the display apparatus 100. Among the configurations of the display apparatus 100, configurations other than the parts illustrated in FIG. 1 may be mounted inside the vehicle (or at least a part of the inside of the vehicle).

Figure 2:
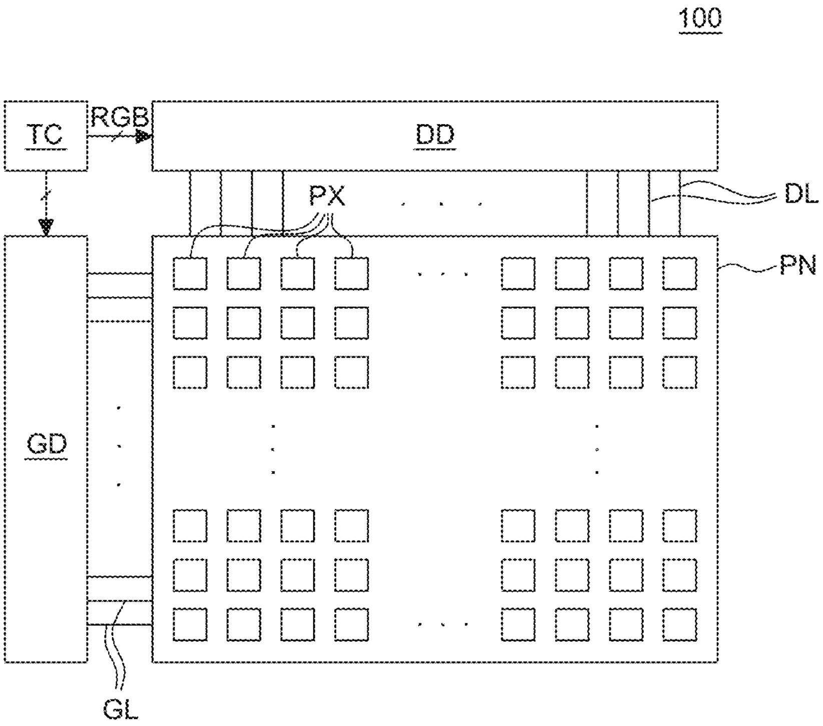
FIG. 2 is a functional block diagram of a display apparatus according to an exemplary embodiment of the present disclosure.

FIG. 2 is a functional block diagram of a display apparatus according to an exemplary embodiment of the present disclosure.

The display apparatus 100 according to the exemplary embodiment of the present disclosure may be applied to the electroluminescent display. The electroluminescent display apparatus may use an organic light emitting diode (OLED) display apparatus, a quantum dot light emitting diode display apparatus, or an inorganic light emitting diode display apparatus.

Referring to FIG. 2, the display apparatus 100 may include a display panel PN, a data driving circuit DD, a gate driving circuit GD, and a timing controller TC.

The display panel PN may generate images to be provided to the user. For example, the display panel PN generates and may display images to be provided to the user through a pixel PX in which a plurality of sub pixel circuits is disposed.

The data driving circuit DD, the gate driving circuit GD, and the timing controller TC may provide signals for operations of the pixels PX through signal lines. The signal lines may include data lines DL and gate lines GL, for example.

The data lines DL are disposed in a column direction and may include a plurality of wiring lines connected to pixels PX disposed in one column direction. The gate lines GL are disposed in a row direction and may include a plurality of wiring lines connected to pixels PX disposed in one row direction.

In some cases, the display apparatus 100 may further include a power unit. In this case, a signal for an operation of the pixel PX may be supplied through the power line which connects the power unit and the display panel PN. According to the exemplary embodiment, the power unit may supply a power to the data driving circuit DD and the gate driving circuit GD. The data driving circuit DD and the gate driving circuit GD may be driven based on the power supplied from the power unit.

For example, the data driving circuit DD applies a data signal to each pixel PX through the data lines DL. The gate driving circuit GD applies a gate signal to each pixel PX through the gate lines GL. The power unit may supply a power voltage to each pixel PX through the power voltage supply lines.

The timing controller TC may control the data driving circuit DD and the gate driving circuit GD. For example, the timing controller TC redisposes digital video data input from the outside in accordance with a resolution of the display panel PN to supply the digital video data to the data driving circuit DD.

The data driving circuit DD converts digital video data input from the timing controller TC into an analog data voltage based on the data control signal to supply the converted analog data voltage to the plurality of data lines.

The gate driving circuit GD may generate a scan signal and an emission signal (or an emission control signal) based on the gate control signal. The gate driving circuit GD may include a scan driver and an emission signal driver. The scan driver generates a scan signal in a row sequential manner to drive at least one scan line connected to each pixel row to supply the scan signal to the scan lines. The emission signal driver generates an emission signal in a row sequential manner to drive at least one emission signal line connected to each pixel row to supply the emission signal to the emission signal lines.

According to the exemplary embodiment, the gate driving circuit GD may be disposed in the display panel PN in a gate-driver in panel (GIP) manner. For example, the gate driving circuit GD is divided into a plurality of circuits to be disposed on at least two side surfaces of the display panel PN.

The display panel PN may include an active area and a non-active area which encloses the active area.

The active area of the display panel PN may include a plurality of pixels disposed in a row direction and a column direction. The pixel PX may be disposed in an area where a plurality of data lines (for example, data lines DL of FIG. 3) and a plurality of gate lines (for example, gate lines GL of FIG. 3) intersect.

One pixel PX includes a plurality of sub pixels which emits different color light. For example, the pixel PX uses three sub pixels to implement blue, red, and green. However, this is not limited thereto, and in some cases, the pixel PX may further include a sub pixel for further implementing a specific color (for example, white).

In the pixel PX, an area which implements blue is referred to as a blue sub pixel, an area which implements red is referred to as a red sub pixel, and an area which implements green may be referred to as a green sub pixel.

Each of the plurality of sub pixels may include a first light emitting diode and a second light emitting diode which emit a same color of light, a first lens which refracts light from the first light emitting diode to a specific direction, and a second lens which refracts light from the second light emitting diode to a specific direction. Therefore, the first lens and the second lens may limit the viewing angle of each of the plurality of sub pixels.

The first lens and the second lens will be described in detail below with reference to FIGS. 6 and 7.

The non-active area may be disposed along the circumference of the active area. Various components for driving a plurality of sub pixels disposed in the pixel PX may be disposed in the non-active area. For example, at least a part of the gate driving circuit GD may be disposed in the non-active area. The non-active area may be referred to as a bezel area.

Figure 3:
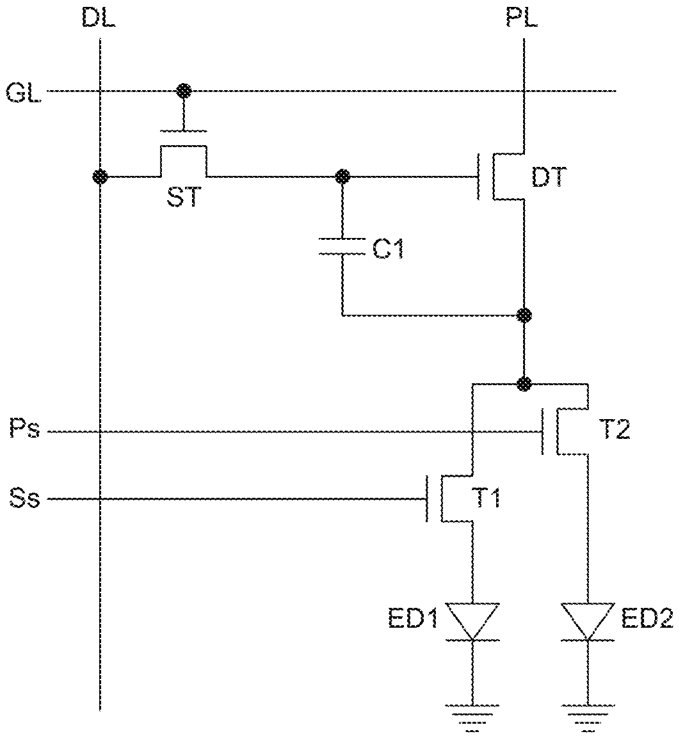
FIG. 3 illustrates an example of a sub pixel circuit of a display apparatus according to an exemplary embodiment of the present disclosure.

FIG. 3 is a circuit diagram of a sub pixel of a display apparatus according to an exemplary embodiment of the present disclosure. The plurality of pixels PX may include a plurality of sub pixels which represents different colors and a sub pixel circuit corresponding to each of the plurality of sub pixels. FIG. 3 illustrates an example of a sub pixel circuit for one sub pixel disposed in the pixel PX.

Referring to FIG. 3, the sub pixel circuit may include a plurality of transistors DT, ST, T1, and T2, a capacitor C1, and a plurality of light emitting diodes ED1 and ED2.

The driving transistor DT and the capacitor C1 may be connected to the switching transistor ST. A first electrode of the driving transistor DT may be connected to a power voltage supply line PL.

The switching transistor ST is connected to the gate line GL to be supplied with a gate signal. The switching transistor ST may be turned on or turned off by the gate signal. A first electrode of the switching transistor ST may be connected to the data line DL. In this case, as the switching transistor ST is turned on, the data signal may be supplied to the gate electrode of the driving transistor DT through the switching transistor ST.

The capacitor C1 may be disposed between the gate electrode and the second electrode of the driving transistor DT. The capacitor C1 may maintain a signal applied to the gate electrode of the driving transistor DT, for example, a data signal, for one frame.

According to the exemplary embodiment, the driving transistor DT, the switching transistor ST, and the capacitor C1 are components for allowing the light emitting diode (for example, a first light emitting diode ED1 and a second light emitting diode ED2) to emit light and are referred to as driving parts, but are not limited by the term.

The first light emitting diode ED1 may be connected to the first transistor T1 which is turned on or off by a first mode signal Ss. The second light emitting diode ED2 may be connected to the second transistor T2 which is turned on or off by a second mode signal Ps.

In this case, the first light emitting diode ED1 or the second light emitting diode ED2 may be connected to another configuration of the sub pixel circuit illustrated in FIG. 3, for example, the driving transistor DT according to a mode. The mode may be specified by the user's input or determined when a predetermined condition is satisfied. For example, when a predetermined first condition is satisfied, the first light emitting diode ED1 may emit light as the first mode signal Ss is supplied. When a predetermined second condition is satisfied, the second light emitting diode ED2 may emit light as the second mode signal Ps is supplied. The first condition may include a condition which is specified in advance to be driven in a first mode. The second condition may include a condition which is specified in advance to be driven in a second mode.

When the first mode signal Ss is input as a low value, the sub pixel circuit may operate in the first mode. When the second mode signal Ps is input as a low value, the sub pixel circuit may operate in the second mode. At this time, the first mode may be a wide-view mode and the second mode is a narrow-view mode.

Transistors DT, ST, T1, and T2 of FIG. 3 include at least one of oxide semiconductors such as amorphous silicon, polycrystalline silicon, and indium gallium zinc oxide (IGZO). The first electrode or the second electrode of the transistor may be a source electrode or a drain electrode. For example, the first electrode is a source electrode and the second electrode may be a drain electrode. As another example, the first electrode is a drain electrode and the second electrode may be a source electrode.

Figure 4:
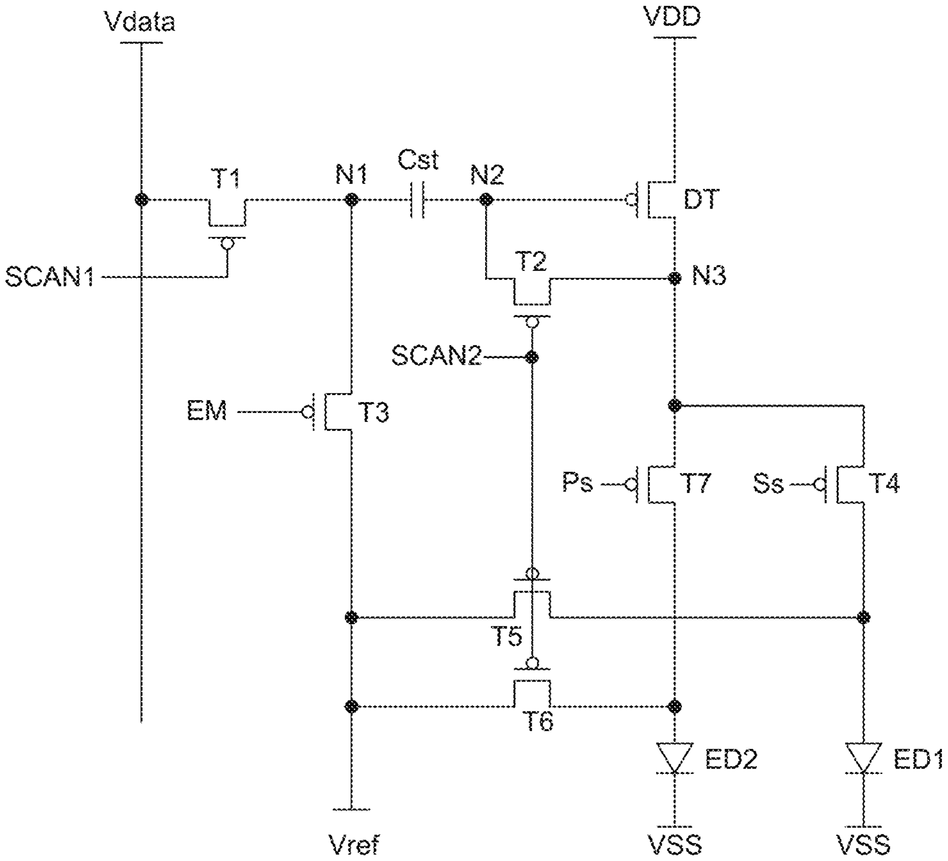
FIG. 4 illustrates an example of an exemplary sub pixel circuit which is applicable as a sub pixel circuit of a display apparatus according to an exemplary embodiment of the present disclosure.

FIG. 4 illustrates an example of an exemplary sub pixel circuit which is applicable as a sub pixel circuit of a display apparatus according to an exemplary embodiment of the present disclosure. FIG. 4 illustrates an exemplary sub pixel circuit which is applicable as a sub pixel circuit illustrated in FIG. 3.

Referring to FIG. 4, the sub pixel circuit includes a first transistor T1, a second transistor T2, a third transistor T3, a fourth transistor T4, a fifth transistor T5, a sixth transistor T6, a seventh transistor T7, a driving transistor DT, a storage capacitor Cst, a first light emitting diode ED1, and a second light emitting diode ED2.

At least some of the plurality of transistors included in the sub pixel circuit illustrated in FIG. 4 may be an n-type transistor or a p-type transistor. In the case of the p-type transistor, a low level voltage of each driving signal refers to a voltage which turns on a thin film transistor (TFT) and a high level voltage of each driving signal may refer to a voltage which turns off the TFT.

Here, the low level voltage corresponds to a predetermined voltage which is lower than the high level. For example, the low level voltage includes a voltage corresponding to a range of −8 V to −12 V. The high level voltage is a predetermined voltage which is higher than the low level voltage. For example, the high level voltage may include a voltage corresponding to the range of 12V to 16V. According to the exemplary embodiment, the low level voltage is referred to as a first voltage and the high level voltage is referred to as a second voltage. In this case, the first voltage may be lower than the second voltage.

Here, a first electrode or a second electrode of the transistor to be described below may refer to a source electrode or a drain electrode. However, the terms of the first electrode and the second electrode are terms for distinguishing the electrodes, but do not limit what corresponds to each electrode. Further, in each electrode, the first electrode may not refer to the same electrode. For example, a first electrode of the first transistor T1 refers to a source electrode of the first transistor T1 and a first electrode of the sixth transistor T6 may refer to a drain electrode of the sixth transistor T6.

The driving transistor DT may control a driving current applied to a plurality of light emitting diodes in accordance with a source-gate voltage Vsg. The driving transistor DT includes a source electrode connected to a high potential driving voltage line to which a high potential driving voltage VDD is supplied, a gate electrode connected to a second node N2, and a drain electrode connected to a third node.

The first transistor T1 may apply a data voltage Vdata to the first node N1 from the data line DL. The first transistor T1 includes a source electrode connected to the data line, a drain electrode connected to the first node N1, and a gate electrode connected to a first scan signal line SL1 to which the first scan signal SCAN1 is applied. The first transistor T1 may be turned on or turned off by the first scan signal SCAN1. Accordingly, the first transistor T1 may apply a data voltage Vdata supplied from the data line DL to the first node N1, in response to a low level of first scan signal SCAN1 which is a turn-on level.

The second transistor T2 may form diode connection of a gate electrode and a drain electrode of the driving transistor DT. The second transistor T2 includes a drain electrode connected to the second node N2, a source electrode connected to the third node N3, and a gate electrode connected to a second scan signal line SL2 to which a second scan signal SCAN2 is applied. The second transistor T2 may be turned on or turned off by the second scan signal SCAN2. Therefore, the second transistor T2 may form a diode connection of the gate electrode and the drain electrode of the driving transistor DT in response to a low level of second scan signal SCAN2 which is a turn-on level.

The third transistor T3 may apply a reference voltage Vref to the first node N1. The third transistor T3 includes a source electrode which is connected to the reference line transmitting the reference voltage Vref, a drain electrode which is connected to the first node N1, and a gate electrode which is connected to the emission signal line EML. The third transistor T3 may be turned on or turned off by the emission signal EM. Accordingly, the third transistor T3 may transmit the reference voltage Vref to the first node N1 in response to a low level of emission signal EM which is a turn-on level.

The fourth transistor T4 may form a current path between the driving transistor DT and the first light emitting diode ED1 in the wide-view mode. The fourth transistor T4 includes a source electrode connected to the third node N3, a drain electrode connected to an anode electrode of the first light emitting diode ED1, and a gate electrode connected to a first control line. The fourth transistor T4 may be turned on or turned off by the first mode signal Ss. Therefore, the fourth transistor T4 forms a current path between the third node N3 which is the source electrode of the fourth transistor T4 and the first light emitting diode ED1 in response to a low level of first mode signal Ss which is a turn-on level. That is, the fourth transistor T4 forms a current path between the driving transistor DT and the first light emitting diode ED1 in response to a low level of first mode signal Ss. Therefore, the fourth transistor T4 may be referred to as a first emission control transistor which controls emission of the first light emitting diode ED1.

Here, the first mode signal Ss is supplied by a mode controller MC to be described below and may control the driving (or emission) of the first light emitting diode ED1 in which the first lens is disposed.

The fifth transistor T5 may apply a reference voltage Vref to the anode electrode of the first light emitting diode ED1. The fifth transistor T5 includes a source electrode connected to the reference line which transmits the reference voltage Vref, a drain electrode connected to the anode electrode of the first light emitting diode ED1, and a gate electrode connected to a second scan signal line SL2 to which a second scan signal SCAN2 is applied. The fifth transistor T5 may be turned on or turned off by the second scan signal SCAN2. Therefore, the fifth transistor T5 may apply the reference voltage Vref to the anode electrode of the first light emitting diode ED1 in response to the low level of second scan signal SCAN2 which is a turn-on level.

The sixth transistor T6 may apply a reference voltage Vref to the anode electrode of the second light emitting diode ED2. The sixth transistor T6 includes a source electrode connected to the reference line which transmits the reference voltage Vref, a drain electrode connected to the anode electrode of the second light emitting diode ED2, and a gate electrode connected to a second scan signal line SL2 to which a second scan signal SCAN2 is applied. The sixth transistor T6 is turned on or turned off by the second scan signal SCAN2. Therefore, the sixth transistor T6 may apply the reference voltage Vref to the anode electrode of the second light emitting diode ED2 in response to the low level of second scan signal SCAN2 which is a turn-on level.

The seventh transistor T7 may form a current path between the driving transistor DT and the second light emitting diode ED2 in the narrow-view mode. The seventh transistor T7 includes a source electrode connected to the third node N3, a drain electrode connected to the anode electrode of the second light emitting diode ED2, and a gate electrode connected to a second control line. The seventh transistor T7 is turned on or turned off by the second mode signal Ps. Therefore, the seventh transistor T7 forms a current path between the third node N3 which is the source electrode of the seventh transistor T7 and the second light emitting diode ED2 in response to a low level of second mode signal Ps which is a turn-on level. That is, the seventh transistor T7 forms a current path between the driving transistor DT and the second light emitting diode ED2 in response to a low level of second mode signal Ps. Therefore, the seventh transistor T7 may be referred to as a second emission control transistor which controls emission of the second light emitting diode ED2.

Here, the second mode signal Ps is supplied by the mode controller to be described below and may control the driving (or emission) of the second light emitting diode ED2 in which the second lens is disposed.

The storage capacitor Cst includes a first electrode connected to the first node N1 and a second electrode connected to the second node N2. That is, one electrode of the storage capacitor Cst is connected to the gate electrode of the driving transistor DT and the other electrode of the storage capacitor Cst is connected to the first transistor T1. The storage capacitor Cst stores a predetermined voltage to constantly maintain a voltage of the gate electrode of the driving transistor DT while the light emitting diode emits light. The first light emitting diode ED1 emits light in a wide-view mode. A semi-cylindrical first lens 161 is disposed on the first light emitting diode ED1 to implement a wide-view mode. The first light emitting diode ED1 includes an anode electrode connected to the fourth transistor T4 and a cathode electrode connected to a low potential power line to which a low potential power VSS is applied. In a wide-view mode, the first light emitting diode ED1 is supplied with a driving current of the driving transistor DT through the turned-on fourth transistor T4. Therefore, in the wide-view mode, the first light emitting diode ED1 is supplied with the driving current to emit light.

The second light emitting diode ED2 emits light in a narrow-view mode. A hemispherical second lens 162 is disposed on the second light emitting diode ED2 to implement a narrow-view mode. The second light emitting diode ED2 includes an anode electrode connected to the seventh transistor T7 and a cathode electrode connected to a low potential power line. In a narrow-view mode, the second light emitting diode ED2 is supplied with a driving current of the driving transistor DT through the turned-on seventh transistor T7. Therefore, in the narrow-view mode, the second light emitting diode ED2 is supplied with the driving current to emit light.

Figure 5A:
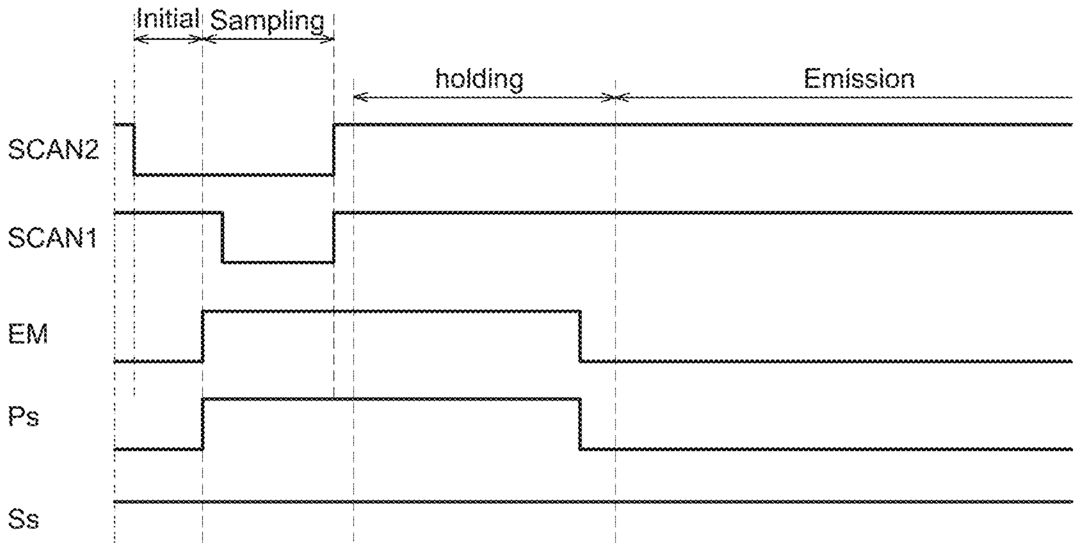
FIGS. 5A and 5B are waveform diagrams for explaining a sub pixel circuit of FIG. 4.
Figure 5B:
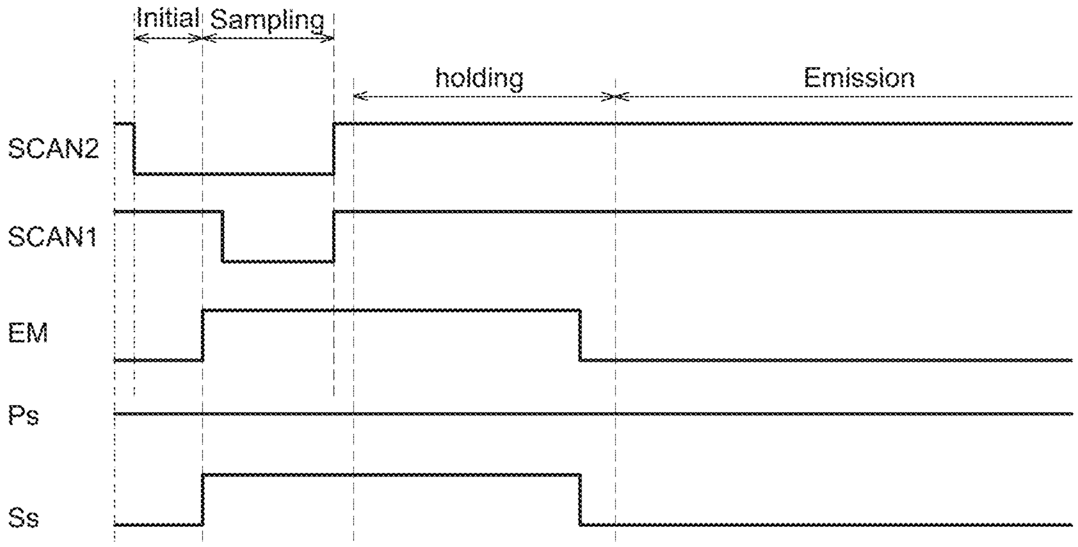

FIGS. 5A and 5B are waveform diagrams for explaining a sub pixel circuit of FIG. 4.

Referring to FIGS. 4 to 5B together, in the wide-view mode, only the first light emitting diode ED1 emits light and in the narrow-view mode, only the second light emitting diode ED2 may emit light. In the wide-view mode, in order to allow only the first light emitting diode ED1 to emit light, the second mode signal Ps which controls the emission of the second light emitting diode ED2 is output only at a high level which is a turn-off level. In the narrow-view mode, in order to allow only the second light emitting diode ED2 to emit light, the first mode signal Ss which controls the emission of the first light emitting diode ED1 may be output only at a high level which is a turn-off level.

Specifically, in the wide-view mode, in an initialization period, a low level of second scan signal SCAN2, a low level of first mode signal Ss, and a low level of emission signal EM are output. The second transistor T2, the fifth transistor T5, and the sixth transistor T6 are turned on by the low level of second scan signal SCAN2, the fourth transistor T4 is turned on by the low level of first mode signal Ss, and the third transistor T3 may be turned on by the low level of emission signal EM.

The first node N1 may be initialized to the reference voltage Vref through the turned-on third transistor T3. A voltage of the anode electrode of the first light emitting diode ED1 is initialized to the reference voltage Vref through the turned-on fifth transistor T5. A voltage of the anode electrode of the second light emitting diode ED2 may be initialized to the reference voltage Vref through the turned-on sixth transistor T6. Further, the driving transistor DT forms a diode connection through the turned-on second transistor T2 to short the gate electrode and the drain electrode of the driving transistor DT so that the driving transistor DT operates as a diode. Further, the reference voltage Vref which is transmitted to the anode electrode of the first light emitting diode ED1 through the turned-on fifth transistor T5 is transmitted to the third node N3 and the second node N2 through the turned-on fourth transistor T4 so that the third node N3 and the second node N2 may be also initialized to the reference voltage Vref.

Next, during the sampling period, the low level of first scan signal SCAN1 and the low level of second scan signal SCAN2 are output and the first mode signal Ss may be output at a high level. A high level of emission signal EM is output so that the third transistor T3 is turned off and the first transistor T1 is turned on by the low level of first scan signal SCAN1, simultaneously to transmit the data voltage Vdata to the first node N1. Further, the driving transistor DT forms diode connection by the turned-on second transistor T2 and a difference voltage of the high potential power voltage and the threshold voltage is sampled to be supplied to the second node N2.

Further, during the holding period, the first scan signal SCAN1 and the second scan signal SCAN2 are output at a high level and all the first transistor T1, the second transistor T2, the fifth transistor T5, and the sixth transistor T6 may be turned off. However, even though the first transistor T1 is turned off, the data voltage Vdata which has been input at the previous second timing t2 may be maintained by the storage capacitor Cst.

Finally, during the emission period, a low level of first mode signal Ss and emission signal EM are output and a high level of second mode signal Ps is output. The reference voltage Vref is applied to the first node N1 through the third transistor T3 which is turned on by the low level of emission signal EM and the voltage of the first node N1 may become the difference voltage of the reference voltage Vref and the data voltage Vdata. Such voltage fluctuation may be reflected to the second node N2. The gate-source voltage Vgs of the driving transistor DT is set to a value Vth−Vref+Vdata obtained by subtracting the reference voltage Vref from a threshold voltage Vth and then adding the data voltage Vdata to control the driving current.

Further, the driving current is supplied from the driving transistor DT to the first light emitting diode ED1 through the turned-on fourth transistor T4 so that the first light emitting diode ED1 may emit light. However, the second mode signal Ps is output at a high level to turn off the seventh transistor T7 so that the driving current from the driving transistor DT is not transmitted to the second light emitting diode ED2. Accordingly, in the wide-view mode, the driving current is applied only to the first light emitting diode ED1 so that only the first light emitting diode ED1 may emit light.

With regard to the narrow-view mode, except that the first mode signal Ss and the second mode signal Ps are oppositely output, the sub pixel circuit illustrated in FIG. 4 may be driven in the substantially same manner as the wide-view mode. That is, the first mode signal Ss is output only at a high level which is a turn-off level and the second mode signal Ps may be output at a low level which is a turn-on level during the emission period in which the second light emitting diode ED2 emits light.

Specifically, during the initialization period, the first scan signal SCAN1 is output at a high level and the second scan signal SCAN2 is output at a low level. Further, the first mode signal Ss is output at a high level and the second mode signal Ps and the emission signal EM are output at a low level. Therefore, the second transistor T2, the fifth transistor T5, and the sixth transistor T6 are turned on by the second scan signal SCAN2, the seventh transistor T7 is turned on by the second mode signal Ps, and the third transistor T3 may be turned on by the emission signal EM.

The first node N1 is initialized to the reference voltage Vref through the third transistor T3 which is turned on by the emission signal EM. The anode electrodes of the first light emitting diode ED1 and the second light emitting diode ED2 may be initialized to the reference voltage Vref by the fifth transistor T5 and the sixth transistor T6 which are turned on by the second scan signal SCAN2. Further, the driving transistor DT forms diode connection through the turned on second transistor T2 to operate as a diode. Finally, the reference voltage Vref which is transmitted to the anode electrode of the second light emitting diode ED2 through the turned-on sixth transistor T6 is transmitted to the third node N3 and the second node N2 through the turned-on seventh transistor T7 so that the third node N3 and the second node N2 may be also initialized to the reference voltage Vref.

Next, during the sampling period, the low level of first scan signal SCAN1 and the low level of second scan signal SCAN2 are output and the second mode signal Ps and the emission signal EM may be output at a high level from the low level. A high level of emission signal EM is output so that the third transistor T3 is turned off and the first transistor T1 is turned on by the low level of first scan signal SCAN1 to transmit the data voltage Vdata to the first node N1. Further, the driving transistor DT forms diode connection by the turned-on second transistor T2 and a difference voltage of the high potential power voltage and the threshold voltage is sampled to be supplied to the second node N2.

Finally, during the emission period, a low level of second mode signal Ps and emission signal EM are output and a high level of first mode signal Ss is output. The reference voltage Vref is applied to the first node N1 through the third transistor T3 which is turned on by the low level of emission signal EM and the voltage of the first node N1 may become the difference voltage of the reference voltage Vref and the data voltage Vdata. Such voltage fluctuation may be reflected to the second node N2. The gate-source voltage Vgs of the driving transistor DT is set to a value Vth−Vref+Vdata obtained by subtracting the reference voltage Vref from the threshold voltage Vth and then adding the data voltage Vdata to control the driving current.

Further, the driving current is supplied from the driving transistor DT to the second light emitting diode ED2 through the turned-on seventh transistor T7 so that the second light emitting diode ED2 may emit light. However, the first mode signal Ss is output at a high level to turn off the fourth transistor T4 so that the driving current from the driving transistor DT is not transmitted to the first light emitting diode ED1. Accordingly, in the narrow-view mode, the driving current is applied only to the second light emitting diode ED2 so that only the second light emitting diode ED2 may emit light.

Figure 6:
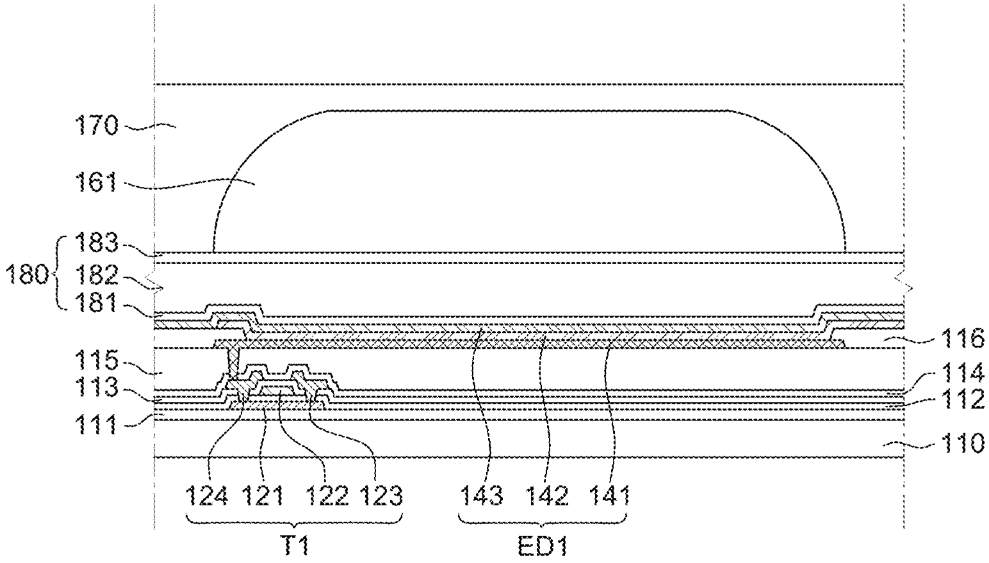
FIGS. 6 and 7 are cross-sectional views of a display apparatus according to an exemplary embodiment of the present disclosure.
Figure 7:
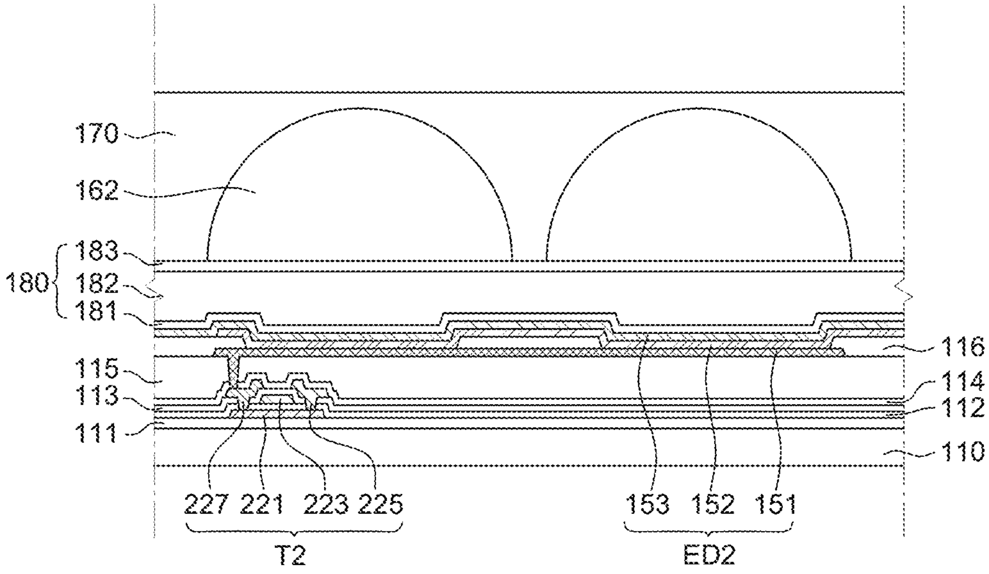

FIGS. 6 and 7 are cross-sectional views of a display apparatus according to an exemplary embodiment of the present disclosure.

FIG. 6 illustrates a sub pixel in which a first lens 161 is disposed and FIG. 7 illustrates a sub pixel in which a second lens 162 is disposed.

Referring to FIGS. 6 and 7, the display apparatus 100 according to the exemplary embodiment of the present disclosure may include a substrate 110, a buffer film 111, a gate insulating film 112, an interlayer insulating film 113, a lower protection film 114, an overcoat layer 115, a first transistor T1, a second transistor T2, a first light emitting diode ED1, a second light emitting diode ED2, a first lens 161, a second lens 162, a lens protection layer 170, and an encapsulation member 180.

The substrate 110 may include an insulating material. The substrate 110 may include a transparent material. For example, the substrate 110 may include glass or plastic.

The buffer film 111 may be disposed on the substrate 110. The buffer film 111 may include an insulating material. For example, the buffer film 111 may include an inorganic insulating material, such as silicon oxide (SiOx) or silicon nitride (SiNx). The buffer film 111 may have a multi-layered structure. For example, the buffer film 111 may have a laminated structure of a film formed of silicon nitride (SiNx) and a film formed of silicon oxide (SiOx).

The buffer film 111 may be located between the substrate 110 and a driving part of each pixel PX. The buffer film 111 may suppress the contamination due to the substrate 110 in a process of forming the driving part. For example, a top surface of the substrate 110 which is directed to the driving part of each pixel PX may be covered by the buffer film 111. The driving part of each pixel PX may be located on the buffer film 111.

The gate insulating film 112 may be disposed on the buffer film 111. The gate insulating layer 112 may include an insulating material. For example, the gate insulating film 112 may include an inorganic insulating material, such as silicon oxide (SiO) or silicon nitride (SiN). The gate insulating film 112 may include a material having a high permittivity. For example, the gate insulating film 112 may include a High-K material, such as hafnium oxide (HfO). The gate insulating film 112 may have a multi-layered structure.

The gate insulating film 112 may extend between the semiconductor layers 121 and 131 of the transistors T1 and T2 and the gate electrodes 122 and 132. For example, gate electrodes of the driving transistor DT and the switching transistor ST may be insulated from semiconductor layers of the driving transistor DT and the switching transistor ST by the gate insulating film 112. The gate insulating film 112 may cover the semiconductor layer of each pixel PX. The gate electrodes of the driving transistor DT and the switching transistor ST may be located on the gate insulating film 112.

The interlayer insulating film 113 may be disposed on the gate insulating film 112. The interlayer insulating film 113 may include an insulating material. For example, the interlayer insulating film 113 may include an inorganic insulating material, such as silicon oxide (SiO) or silicon nitride (SiN). The interlayer insulating film 113 may extend between the gate electrode and the source electrode and between the gate electrode and the drain electrode of each of the driving transistor DT and the switching transistor ST. For example, the source electrode and the drain electrode of each of the driving transistor DT and the switching transistor ST may be insulated from the gate electrode by the interlayer insulating film 113. The interlayer insulating film 113 may cover the gate electrode of each of the driving transistor DT and the switching transistor ST. The source electrode and the drain electrode of each pixel PX may be located on the interlayer insulating film 113. The gate insulating film 112 and the interlayer insulating film 113 may expose a source region and a drain region of each semiconductor pattern which is located in each pixel PX.

The lower protection film 114 may be disposed on the interlayer insulating film 113. The lower protection film 114 may include an insulating material. For example, the lower protection film 114 may include an inorganic insulating material, such as silicon oxide (SiO) or silicon nitride (SiN). The lower protection film 114 may suppress the damage of the driving part due to the external moisture and shocks. The lower protection film 114 may extend along surfaces of the driving transistor DT and the switching transistor ST which are opposite to the substrate 110. The lower protection film 114 may be in contact with the interlayer insulating film 113 at the outside of the driving part located in each pixel PX.

The overcoat layer 115 may be disposed on the lower protection film 114. The overcoat layer 115 may include an insulating material. The overcoat layer 115 may include a material different from that of the lower protection film 114. For example, the overcoat layer 115 may include an organic insulating material. The overcoat layer 115 may remove a step caused by the driving part of each pixel PX. For example, a top surface of the overcoat layer 115 which is opposite to the device substrate 110 may be a flat surface.

The first transistor T1 and the second transistor T2 may be disposed on the substrate 110. The first transistor T1 may be electrically connected between the drain electrode of the driving transistor DT and the first lower electrode 141 of the first light emitting diode ED1. The second transistor T2 may be electrically connected between the drain electrode of the driving transistor DT and the second lower electrode 151 of the second light emitting diode ED2.

The first transistor T1 may include a first semiconductor layer 121, a first gate electrode 122, a first source electrode 123, and a first drain electrode 124. The first transistor T1 may have the same structure as the switching transistor ST and the driving transistor DT. For example, the first semiconductor layer 121 is located between the buffer film 111 and the gate insulating film 112 and the first gate electrode 122 may be located between the gate insulating film 112 and the interlayer insulating film 113. The first source electrode 123 and the first drain electrode 124 may be located between the interlayer insulating film 113 and the lower protection film 114. The first gate electrode 122 may overlap a channel region of the first semiconductor layer 121. The first source electrode 123 may be electrically connected to the source region of the first semiconductor layer 121. The first drain electrode 124 may be electrically connected to the drain region of the first semiconductor layer 121.

The second transistor T2 may include a second semiconductor layer 131, a second gate electrode 132, a second source electrode 133, and a second drain electrode 134. For example, the second semiconductor layer 131 is located on the same layer as the first semiconductor layer 121 and the second gate electrode 132 is located on the same layer as the first gate electrode 122. The second source electrode 133 and the second drain electrode 134 may be located on the same layer as the first source electrode 123 and the first drain electrode 124.

The first light emitting diode ED1 and the second light emitting diode ED2 of each pixel PX may be disposed on the overcoat layer 115 of the corresponding pixel PX.

The first light emitting diode ED1 may emit light representing a specific color. For example, the first light emitting diode ED1 may include a first lower electrode 141, a first emission layer 142, and a first upper electrode 143 which are sequentially laminated on the substrate 110.

The first lower electrode 141 may include a conductive material. The first lower electrode 141 may include a material having a high reflectance. For example, the first lower electrode 141 may include metal, such as aluminum (Al), or silver (Ag). The first lower electrode 141 may have a multi-layered structure. For example, the first lower electrode 141 may have a structure in which a reflective electrode formed of a metal is located between transparent electrodes formed of a transparent conductive material, such as ITO and IZO. The first lower electrode 141 may be electrically connected to the first drain electrode 217 (or the first source electrode 215) of the first transistor T1 through a contact hole which passes through the lower protection film 114 and the overcoat layer 115.

The first emission layer 142 may generate light with luminance corresponding to a voltage difference between the first lower electrode 141 and the first upper electrode 143. For example, the first light emitting diode 142 may include an emission material layer (EML) including an emission material. The emission material may include an organic material, an inorganic material, or a hybrid material.

The first emission layer 142 may have a multi-layered structure. For example, the first emission layer 142 may further include at least one of a hole injection layer HIL, a hole transport layer HTL, an electron transport layer ETL, and an electron injection layer EIL.

The first upper electrode 143 may include a conductive material. The first upper electrode 143 may include a different material from that of the first lower electrode 141. A transmittance of the first upper electrode 143 is higher than a transmittance of the first lower electrode 141. For example, the first upper electrode 143 may be a transparent electrode formed of a transparent conductive material, such as ITO and IZO. Accordingly, in the display apparatus according to the exemplary embodiment of the present disclosure, light generated by the first emission layer 142 may be emitted through the first upper electrode 143.

The second light emitting diode ED2 may implement the same color as the first light emitting diode ED1. The second light emitting diode ED2 may have the same structure as the first light emitting diode ED1. For example, the second light emitting diode ED2 may include a second lower electrode 151, a second emission layer 152, and a second upper electrode 153 which are sequentially laminated on the substrate 110.

The second lower electrode 151 corresponds to the first lower electrode 141, the second emission layer 152 corresponds to the first emission layer 142, and the second upper electrode 153 corresponds to the first upper electrode 143. For example, the second lower electrode 151 is formed for the second light emitting diode ED2 with the same structure as the first lower electrode 141 and this is the same for the second emission layer 152 and the second upper electrode 153. For example, the first light emitting diode ED1 and the second light emitting diode ED2 may be formed to have the same structure. However, it is not limited thereto and in some cases, at least a partial configuration of the first light emitting diode ED1 and the second light emitting diode ED2 may be formed to be different.

In the exemplary embodiment, the second emission layer 152 may be spaced apart from the first emission layer 142. Therefore, in the display apparatus according to the exemplary embodiment of the present disclosure, light emission by a leakage current may be suppressed.

According to the exemplary embodiment of the present disclosure, in the display apparatus, light is generated by only one of the first emission layer 142 and the second emission layer 152 by the selection of the user or according to a predetermined condition.

The second lower electrode 151 of each pixel PX may be spaced apart from the first lower electrode 141 of the corresponding pixel PX. For example, a bank insulating film 116 may be located between the first lower electrode 141 and the second lower electrode 151 of each pixel PX. The bank insulating film 116 may include an insulating material. For example, the bank insulating film 116 may include an organic insulating material. The bank insulating film 116 may include a material different from that of the overcoat layer 115.

The second lower electrode 151 of each pixel PX may be insulated from the first lower electrode 141 of the corresponding pixel PX by the bank insulating film 116. For example, the bank insulating film 116 may cover an edge of the first lower electrode 141 and an edge of the second lower electrode 151 located in each pixel PX. Accordingly, in the display apparatus, an image by a first lens area of each pixel PX in which the first light emitting diode ED1 is located or an image by a second lens area of each pixel PX in which the second light emitting diode ED2 is located may be provided to the user.

The first emission layer 142 and the first upper electrode 143 of the first light emitting diode ED1 located in each pixel PX may be laminated on a partial area of the first lower electrode 141 exposed by the bank insulating film 116. The second emission layer 152 and the second upper electrode 153 of the second light emitting diode ED2 located in each pixel PX may be laminated on a partial area of the second lower electrode 151 exposed by the bank insulating film 116. For example, the bank insulating film 116 may divide a first emission area E1 in which light by the first light emitting diode ED1 is emitted and a second emission area E2 in which light by the second light emitting diode ED2 is emitted in each pixel PX. A size of the second emission area E2 divided in each pixel PX may be smaller than a size of the first emission area E1.

The second upper electrode 153 of each pixel PX may be electrically connected to the first upper electrode 143 of the corresponding pixel PX. For example, a voltage applied to the second upper electrode 153 of the second light emitting diode ED2 located in each pixel PX is equal to a voltage applied to the first upper electrode 143 of the first light emitting diode ED1 located in the corresponding pixel PX. The second upper electrode 153 of each pixel PX may include the same material as the first upper electrode 143 of the corresponding pixel PX. For example, the second upper electrode 153 of each pixel PX may be formed simultaneously with the first upper electrode 143 of the corresponding pixel PX. The second upper electrode 153 of each pixel PX extends onto the bank insulating film 116 to be in direct contact with the first upper electrode 143 of the corresponding pixel PX. A luminance of the first lens area located in each pixel PX and a luminance of the second lens area may be controlled by a driving current generated in the corresponding pixel PX.

The encapsulation member 180 may be located on the first light emitting diode ED1 and the second light emitting diode ED2 of each pixel PX. The encapsulation member 180 may suppress the damage of the light emitting diodes ED1 and ED2 due to moisture and shocks from the outside. The encapsulation member 180 may have a multi-layered structure. For example, the encapsulation member 180 may include a first encapsulation layer 181, a second encapsulation layer 182, and a third encapsulation layer 183 which are sequentially laminated, but the exemplary embodiments of the present disclosure are not limited thereto. The first encapsulation layer 181, the second encapsulation layer 182, and the third encapsulation layer 183 may include an insulating material. The second encapsulation layer 182 may include a material different from that of the first encapsulation layer 181 and the third encapsulation layer 183. For example, the first encapsulation layer 181 and the third encapsulation layer 183 are inorganic encapsulation layers including an inorganic insulating material and the second encapsulation layer 182 may include an organic encapsulation layer including an organic insulating material. Therefore, the light emitting diodes ED1 and ED2 of the display apparatus may efficiently suppress the damage due to the moisture and shocks from the outside.

The first lens 161 and the second lens 162 may be located on the encapsulation member 180 of each pixel PX.

The first lens 161 may be disposed on the first light emitting diode ED1. Light generated by the first light emitting diode ED1 in each pixel PX may be discharged through the first lens 161 of the corresponding pixel PX. The first lens 161 may have a shape that does not limit light of at least one direction. For example, a planar shape of the first lens 510 located in each pixel PX may have a bar shape which extends in a first direction.

In this case, a traveling direction of light which is discharged from the first lens area of the pixel PX is not limited in the first direction. For example, contents (or images) provided through the first lens area of the pixel PX may be shared by surrounding people which is adjacent to the user in the first direction. When the contents are provided through the first lens area, the contents are provided at a first viewing angle range which is wider than a second viewing angle range supplied by the second lens area and this is referred to as a wide-view mode which is a first mode.

The second lens 162 may be disposed on the second light emitting diode ED2. Light generated by the second light emitting diode ED2 in each pixel PX may be discharged through the second lens 162 of the corresponding pixel PX. A traveling direction of light which passes through the second lens 162 may be limited to the first direction and/or the second direction. For example, a planar shape of the second lens 162 located in the pixel PX may have a circular shape. In this case, a traveling direction of light which is discharged from the second lens area of the pixel PX may be limited to the first direction and the second direction. For example, the contents provided by the second lens area of the pixel PX may not be shared with people around the user.

When the contents are provided through the second lens area, the contents are provided at the second viewing angle range which is narrower than the first viewing angle range supplied by the first lens area and this is referred to as a narrow-view mode which is a second mode.

The first emission area of each pixel PX has a shape corresponding to the first lens 161 of the corresponding pixel PX. For example, a planar shape of the first emission area of each pixel PX may have a bar shape which extends in the first direction. The first lens 161 may have a size larger than the first emission area of the corresponding pixel PX. Accordingly, the efficiency of light discharged from the first emission area of the pixel PX may be improved.

The second emission area of each pixel PX may have a shape corresponding to the second lens 162 of the corresponding pixel PX. For example, a planar shape of the second emission area of each pixel PX may have a circular shape. The second lens 162 has a size larger than the second emission area of the corresponding pixel PX. Accordingly, the efficiency of light discharged from the second emission area of the pixel PX may be improved.

In the exemplary embodiment, the lens protection film 170 may be located on the first lens 161 and the second lens 162 of the pixel PX. The lens protection film 170 may include an insulating material. For example, the lens protection film 170 may include an organic insulating material. A refractive index of the lens protection film 170 is smaller than refractive indexes of the first lens 161 and the second lens 162 located in each pixel PX. Accordingly, in the display apparatus according to the exemplary embodiment of the present disclosure, light which passes through the first lens 161 and the second lens 162 in each pixel PX may not be reflected toward the substrate 110 due to the refractive index difference from the lens protection film 170.

Figure 8:
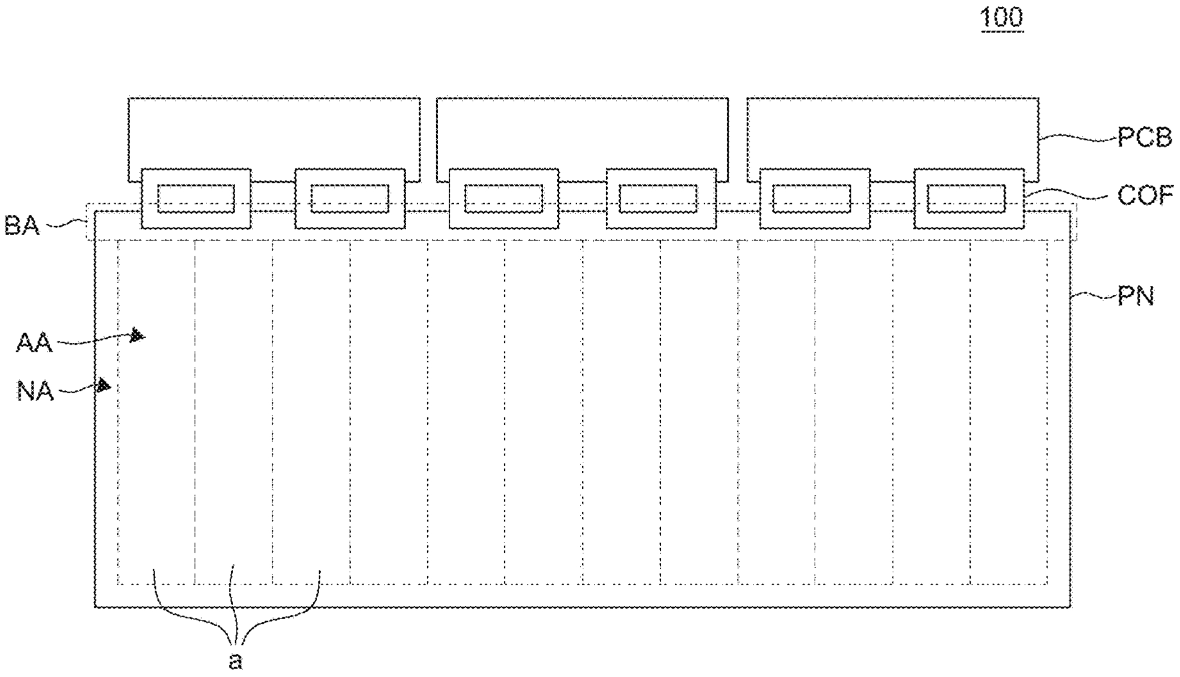
FIG. 8 is a plan view of a display apparatus according to an exemplary embodiment of the present disclosure.

FIG. 8 is a plan view of a display apparatus according to an exemplary embodiment of the present disclosure. For the convenience of description, in FIG. 8, among various components of the display apparatus 100, only a display panel PN, a plurality of flexible films COF, and a plurality of printed circuit board PCB are illustrated.

Referring to FIG. 8, the display apparatus 100 includes a plurality of flexible films COF, a plurality of printed circuit board PCB, and a display panel PN.

The plurality of flexible films COF may be disposed at one end of the display panel PN. The plurality of flexible films COF is films in which various components are disposed on a base film having a ductility to supply a signal to the plurality of pixels PX and a driving circuit and may be electrically connected to the display panel PN. For example, the plurality of flexible films COF may supply a power voltage and a data voltage Vdata to the plurality of pixels PX and the driving circuit.

In the meantime, a driving IC, such as a data driver IC, may be disposed on the plurality of flexible films COF. The driving IC is a component which processes data for displaying images and a driving signal for processing the data. The driving IC may be disposed in a chip on glass (COG), a chip on film (COF), or a tape carrier package (TCP) manner depending on a mounting method. However, for the convenience of description, it is described that the driving IC is mounted on the plurality of flexible films COF by a chip on film technique, but is not limited thereto. Further, the driving IC may be integrated with the timing controller to be disposed as a single chip.

Each of the plurality of printed circuit boards PCB is electrically connected to the plurality of flexible films COF. The plurality of printed circuit boards PCB is components which supply signals to the driving IC. Various components may be disposed in the plurality of printed circuit boards PCB to supply various signals such as a driving signal or a data signal to the driving IC.

The display panel PN may include an active area AA and a non-active area NA which encloses the active area AA. The active area AA of the display panel PN includes a plurality of areas (a) which is divided in the row direction. The plurality of areas (a) may be areas of pixels PX to which the same mode signal is applied. In the meantime, even though in FIG. 8, it is illustrated that the active area AA is divided into twelve areas (a) which extend in the column direction, the exemplary embodiment is not limited thereto.

Figure 9:
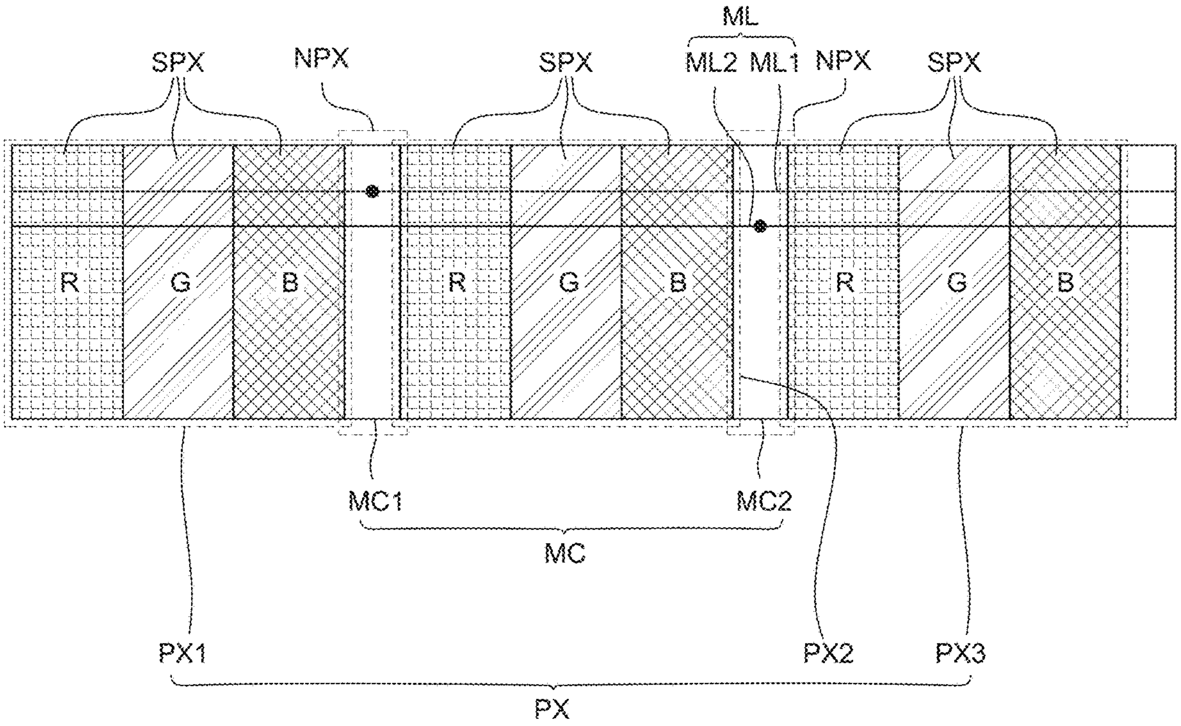
FIG. 9 is an enlarged plan view of a partial area of a display apparatus according to an exemplary embodiment of the present disclosure.

FIG. 9 is an enlarged plan view of a partial area of a display apparatus according to an exemplary embodiment of the present disclosure. In FIG. 9, one of the plurality of areas (a) of FIG. 8 is illustrated and a part of the corresponding area a, for example, an area corresponding to a total of three pixels PX is illustrated.

Referring to 9, in the active area AA (see, e.g., FIG. 8), a mode controller MC which supplies a mode signal to the plurality of sub pixels SPX is disposed. The mode controller MC may supply mode signals Ss and Ps which control the driving mode of the display panel PN to a plurality of sub pixels. For example, the mode controller MC includes a first mode controller MC1 which supplies the first mode signal Ss and a second mode controller MC2 which supplies the second mode signal Ps. Therefore, the first mode controller MC1 supplies the first mode signal Ss which controls the driving mode as a wide-view mode so that it is referred to as a wide-view mode controller. The second mode controller MC2 supplies the second mode signal Ps which controls the driving mode as a narrow-view mode so that it is referred to as a narrow-view mode controller.

One first mode controller MC1 and one second mode controller MC2 may be disposed for each of the plurality of areas (a). For example, the number of the first mode controller MC1 and the second mode controller MC2 is the same as the number of the plurality of areas (a) (see, e.g., FIG. 8) and one first mode controller and one second mode controller are disposed for each of the plurality of areas (a). For example, when the active area AA (see, e.g., FIG. 8) is divided into 12 areas (a), 12 first mode controllers MC1 and 12 mode controllers MC2 are configured and one first mode controller MC1 and one second mode controller MC2 may be disposed in one area (a).

The plurality of areas (a) (see, e.g., FIG. 8) includes a pixel PX and a non-pixel area NPX. The pixel PX includes a plurality of sub pixels SPX. The non-pixel area NPX may be disposed between adjacent pixels PX. The non-pixel area NPX may refer to an area in which the sub pixel SPX is not disposed.

The first mode controller MC1 and the second mode controller MC2 are disposed between adjacent pixels PX. For example, when one area (a) (see, e.g., FIG. 8) includes three pixels PX, the first mode controller MC1 is disposed in a non-pixel area NPX between a first pixel PX1 and a second pixel PX2 and the second mode controller MC2 may be disposed in a non-pixel area NPX between a second pixel PX2 and a third pixel PX3. However, the exemplary embodiment is not limited thereto and when one area (a) (see, e.g., FIG. 8) includes three or more pixels PX, each of the first mode controller MC1 and the second mode controller MC2 may be disposed in two pixels between a plurality of adjacent pixels PX.

A mode signal line ML extending in the row direction is disposed in the plurality of areas (a). The mode signal line ML includes a first mode signal line ML1 and a second mode signal line ML2. The first mode signal line ML1 is connected to the first mode controller MC1 and may transmit the first mode signal Ss supplied from the first mode controller MC1 to the plurality of sub pixels SPX. The second mode signal line ML2 is connected to the second mode controller MC2 and may transmit the second mode signal Ps supplied from the second mode controller MC2 to the plurality of sub pixels SPX. The first mode signal line ML1 and the second mode signal line ML2 extend to the plurality of areas (a) (see, e.g., FIG. 8) in parallel in the row direction and may transmit the first mode signal Ss and the second mode signal Ps to the plurality of sub pixels SPX included in one area (a).

Figure 10:
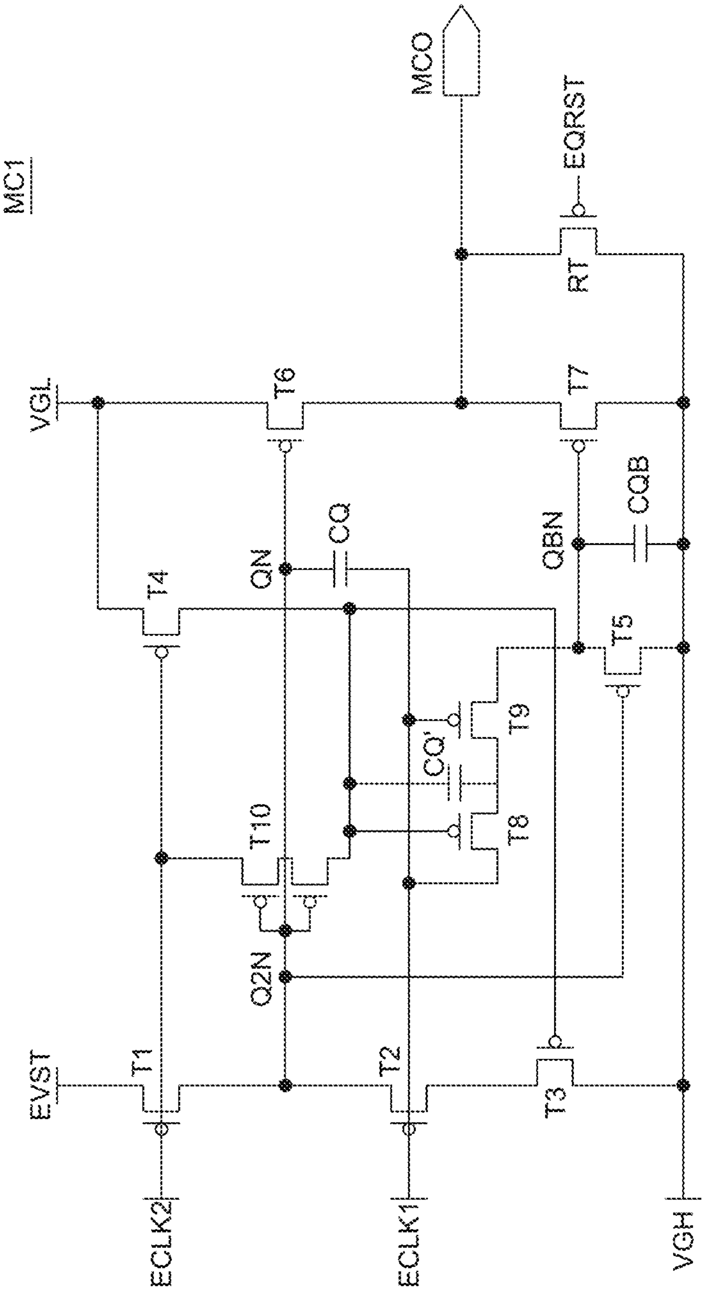
FIG. 10 is a circuit diagram of a mode controller of a display apparatus according to an exemplary embodiment of the present disclosure.

FIG. 10 is a circuit diagram of a mode controller of a display apparatus according to an exemplary embodiment of the present disclosure. In FIG. 10, for the convenience of description, the first mode controller MC1 between the first mode controller MC1 and the second mode controller MC2 is illustrated and the second mode controller MC2 may be configured as the same circuit as the first mode controller MC1.

Referring to FIG. 10, the mode controller MC includes a first transistor T1, a second transistor T2, a third transistor T3, a fourth transistor T4, a fifth transistor T5, a sixth transistor T6, a seventh transistor T7, an eighth transistor T8, a ninth transistor T9, a tenth transistor T10, a reset transistor RT, a first capacitor CQ, a second capacitor CQB, and a third capacitor CQ'.

The first transistor T1 to the tenth transistor T10 may be p-type thin film transistors. In the case of the p-type thin film transistor, a low level voltage of each driving signal refers to a voltage which turns on the TFT and a high level voltage of each driving signal refers to a voltage which turns off the TFT.

The first transistor T1 includes a source electrode connected to a start signal line to which a start signal EVST is applied, a gate electrode connected to a second clock signal line to which a second clock signal ECLK2 is applied, and a drain electrode connected to a Q2 node Q2N. The first transistor T1 is turned on or turned off by the second clock signal ECLK2.

The second transistor T2 includes a source electrode connected to the drain electrode of the first transistor T1 and a Q2 node Q2N, a gate electrode connected to a first clock signal line to which a first clock signal ECLK1 is applied, and a drain electrode connected to a source electrode of the third transistor T3. The second transistor T2 is turned on or turned off by the first clock signal ECLK1.

The third transistor T3 includes a source electrode connected to the drain electrode of the second transistor T2, a gate electrode connected to a drain electrode of the fourth transistor T4, and a drain electrode connected to a first voltage line to which a first voltage VGH is applied. When the fourth transistor T4 is turned on, the third transistor T3 is turned on in response to a low level of second voltage VGL.

The fourth transistor T4 includes a source electrode connected to a second voltage line to which a second voltage VGL is applied, a gate electrode connected to a second clock signal line to which the second clock signal ECLK2 is applied, and a drain electrode connected to the gate electrode of the third transistor T3. The fourth transistor T4 is turned on or turned off in response to the second clock signal ECLK2. The fourth transistor T4 is turned on or turned off simultaneously with the first transistor T1.

The fifth transistor T5 includes a source electrode connected to a drain electrode of the ninth transistor T9, a gate electrode connected to a Q2 node Q2N, and a drain electrode connected to the first voltage line to which the first voltage VGH is applied. The fifth transistor T5 is turned on or turned off in response to a potential of the Q2 node Q2N.

The sixth transistor T6 includes a source electrode connected to the second voltage line to which the second voltage VGL is applied, a gate electrode connected to the Q node Q and one end of the first capacitor CQ, and a drain electrode connected to an output terminal MCO from which a mode signal is output. The sixth transistor T6 is turned on or turned off in response to a potential of the Q node Q.

The seventh transistor T7 includes a source electrode connected to the output terminal MCO, a gate electrode connected to the QB node QBN and one end of the second capacitor CQB, and a drain electrode connected to the first voltage line to which the first voltage VGH is applied. The seventh transistor T7 is turned on or turned off in response to a potential of the QB node QBN.

The eighth transistor T8 includes a source electrode connected to the first clock signal line to which the first clock signal ECLK1 is applied, a gate electrode connected to a drain electrode of the tenth transistor T10, and a drain electrode connected to the source electrode of the ninth transistor T9 and one end of the third capacitor CQ'. The eighth transistor T8 is turned on or turned off in response to a potential of the Q' node Q'N.

The ninth transistor T9 includes a source electrode connected to the drain electrode of the eighth transistor T8 and one end of the third capacitor CQ', a gate electrode connected to the first clock signal line to which the first clock signal ECLK1 is applied, and a drain electrode connected to the source electrode of the fifth transistor T5 and the QB node QBN. The ninth transistor T9 is turned on or turned off in response to the first clock signal ECLK1. The ninth transistor T9 is turned on or turned off simultaneously with the second transistor T2.

The tenth transistor T10 includes a source electrode connected to the second clock signal line to which the second clock signal ECLK2 is applied, a gate electrode connected to the Q2 node Q2N, and a drain electrode connected to the source electrode of the eighth transistor T8. The tenth transistor T10 is turned on or turned off in response to a potential of the Q2 node Q2N. The tenth transistor T10 is turned on or turned off simultaneously with the fifth transistor T5. Meanwhile, as seen from the drawing, the tenth transistor T10 may be implemented by two transistors in which two gate electrodes are commonly connected to the second clock signal line.

The reset transistor RT includes a drain electrode connected to the output terminal MCO, a gate electrode connected to a reset signal line to which a reset signal EQRST is applied, and a drain electrode connected to the first voltage line to which the first voltage VGH is applied. The reset transistor RT is turned on or turned off in response to the reset signal EQRST. When the reset transistor RT is turned on, the output terminal MCO outputs a high level of MOS signal based on the first voltage VGH.

One end of the first capacitor CQ is connected to the Q node QN and the other end is connected to the first clock signal line. One end of the second capacitor CQB is connected to the QB node QBN and the other end is connected to the first voltage line. One end of the third capacitor CQ' is connected to the Q' node Q'N and the other end is connected between the drain electrode of the eighth transistor T8 and the source electrode of the ninth transistor T9.

Figure 11:
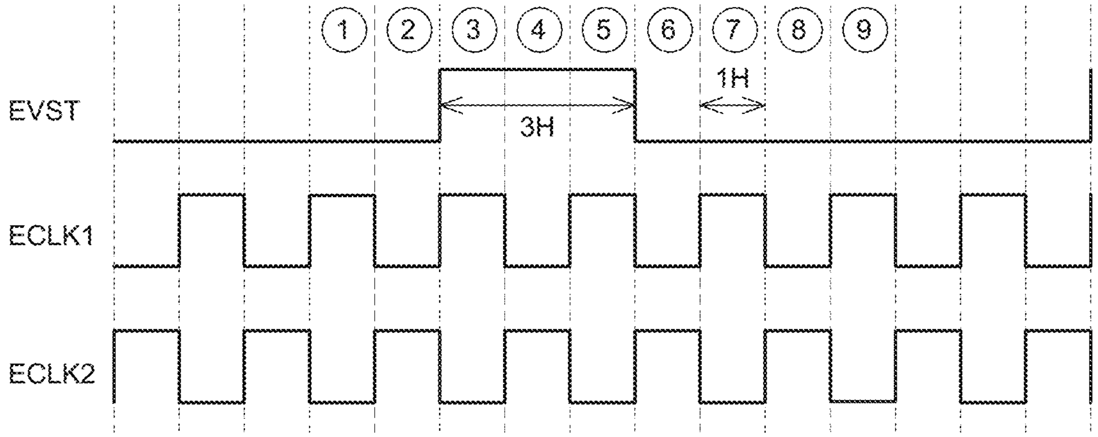
FIGS. 11 and 12 are waveform diagrams for explaining a mode controller of a display apparatus according to an exemplary embodiment of the present disclosure.
Figure 12:
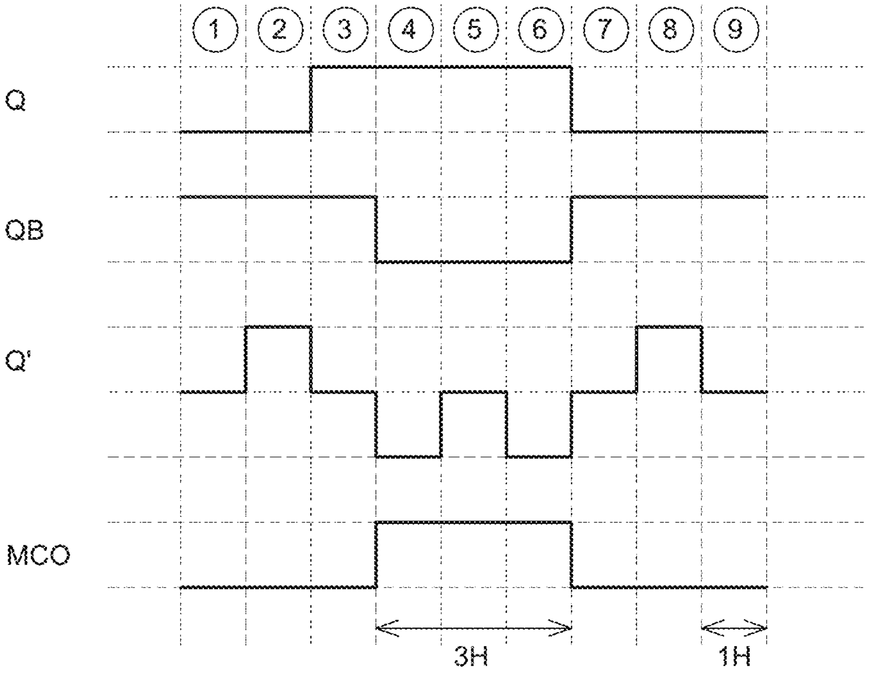

FIGS. 11 and 12 are waveform diagrams for explaining a mode controller of a display apparatus according to an exemplary embodiment of the present disclosure. Even though in FIGS. 11 and 12, for the convenience of description, a waveform diagram of the first mode controller MC1 is described as an example, the second mode controller MC2 is configured with the same circuit as the first mode controller MC1 and is driven with the same waveform diagram.

Referring to FIGS. 11 and 12, the start signal EVST has a shape in which a high level signal is generated during three horizontal times 3H. The second clock signal ECLK2 is synchronized at a high level timing of the start signal EVST so that a low level signal and a high level signal are alternately generated with a period of one horizontal time 1H.

The first clock signal ECLK1 is synchronized at a high level timing of the start signal EVST so that a high level signal and a low level signal are alternately generated with a period of one horizontal time 1H. That is, in the second clock signal ECLK2 and the first clock signal ECLK1, a high level signal and a low level signal may be generated with reversed phases.

The Q node Q has a period in which it is charged to a high level by operations of elements included in the first mode controller MC1 and the Q' node Q' and the QB node QB has a period that it is discharged to a low level. At this time, the QB node QB may maintain a low level signal with a reversed phase which is delayed by one horizontal time 1H from the start signal EVST for three horizontal times 3H.

The sixth transistor is turned on or turned off in response to a potential of the Q node Q and the seventh transistor T7 is turned on or turned off in response to a potential of the QB node QB. When the potential of the Q node Q maintains a high level, the potential of the QB node QB may maintain a low level.

The seventh transistor T7 is turned on in response to the low level signal of the QB node QB so that the first voltage VGH is output through the output terminal MCO of the first mode controller MC1. As a result, the output terminal MCO of the first mode controller MC1 outputs a high level of first mode signal Ss during the three horizontal times 3H based on the first voltage VGH and then switches the signal to a low level of first mode signal Ss.

Accordingly, in the display apparatus 100 according to the exemplary embodiment of the present disclosure may independently control the wide-view mode and the narrow-view mode for each of the plurality divided areas (a) of the active area AA (see, e.g., FIG. 8). The active area AA (see, e.g., FIG. 8) is divided into the plurality of areas (a) and a mode controller MC is disposed in each of the plurality of divided areas (a). The mode signal is transmitted to the pixel PX disposed in the corresponding area (a) (see, e.g., FIG. 8) through the mode signal line MCL connected to the mode controller MC disposed in each area (a) (see, e.g., FIG. 8) to independently control the driving mode of the corresponding area (a) regardless of the driving mode of another adjacent area (a). Accordingly, in the light emitting display apparatus 100 according to the exemplary embodiment of the present disclosure, only a specific area of the screen is freely switched to any one of a wide-view mode and a narrow-view mode to selective limit a viewing angle and may vary an area which is driven in the wide-view mode and the narrow-view mode.

Further, in the display apparatus 100 according to the exemplary embodiment of the present disclosure, the mode controller MC is disposed in the active area AA (see, e.g., FIG. 8) to minimize an area of the non-active area NA. When the mode controller NA is disposed in the driving IC of the flexible film CF connected to the display panel PN, a design of the driving IC is complex. A wiring line for connecting the mode controller MC and the pixel PX is disposed in the flexible film COF and the non-active area NA of the display panel PN. Therefore, there is a problem in that the area of the flexible film COF and the non-active area NA is increased. Accordingly, in the display apparatus 100 according to the exemplary embodiment of the present disclosure, the active area AA (see, e.g., FIG. 8) is divided into the plurality of areas (a) and the mode controller MC is disposed in each of the plurality of divided areas (a) to suppress the complexed design of the driving IC. Further, the increased area of the flexible film COF and the non-active area NA is suppressed so that a bezel part of the display apparatus 100 may be minimized.

Figure 13:
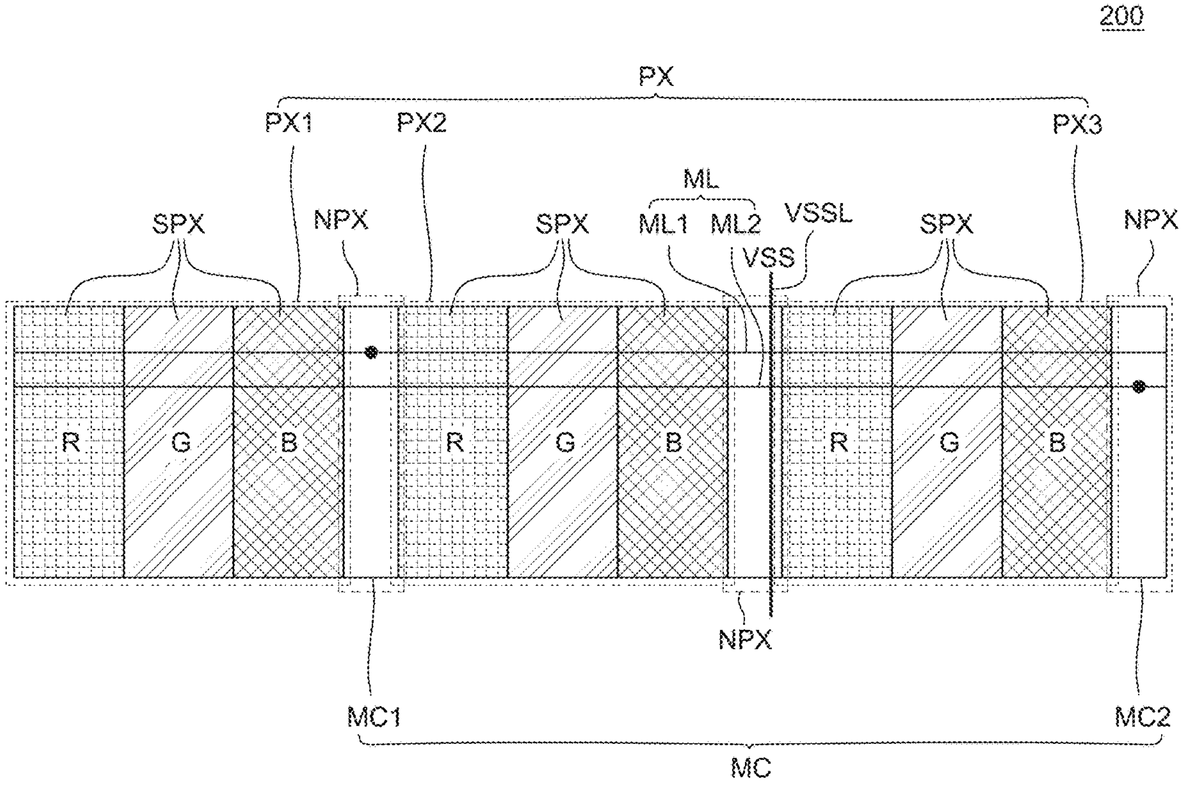
FIG. 13 is an enlarged plan view of a partial area of a display apparatus according to another exemplary embodiment of the present disclosure.

FIG. 13 is an enlarged plan view of a partial area of a display apparatus according to another exemplary embodiment of the present disclosure. A display apparatus 200 of FIG. 13 and the display apparatus 100 of FIGS. 1 to 10 have the substantially same configuration except a low potential power line VSSL, so that a redundant description will be omitted.

Referring to FIG. 13, the first mode controller MC1 and the second mode controller MC2 are disposed in the non-pixel area NPX. For example, when one area (a) (see, e.g., FIG. 8) includes three pixels PX, the first mode controller MC1 is disposed in a non-pixel area NPX between a first pixel PX1 and a second pixel PX2. The second mode controller MC2 is disposed in a non-pixel area NPX between a third pixel PX3 of the corresponding area (a) and a first pixel of an area (a) adjacent to the corresponding area (a). However, the exemplary embodiment is not limited thereto and when one area (a) includes three or more pixels PX, each of the first mode controller MC1 and the second mode controller MC2 may be disposed in two non-pixel areas NPX of non-pixel areas NPX between a plurality of adjacent pixels PX.

In a remaining non-pixel area NPX in which the first mode controller MC1 and the second mode controller MC2 are not disposed, a power line may be disposed. For example, the power line may be a low potential power line VSSL. The low potential power line VSSL is disposed in the remaining non-pixel area NPX in which the first mode controller MC1 and the second mode controller MC2 are not disposed, in the column direction. The low potential power line VSSL is connected to the cathode electrode of the plurality of sub pixels SPX included in the corresponding area (a) (see, e.g., FIG. 8) to apply a low potential power.

In the display apparatus 200 according to another exemplary embodiment of the present disclosure, the active area AA (see, e.g., FIG. 8) is divided into the plurality of areas (a) and a mode controller MC is disposed in each of the plurality of divided areas (a). Accordingly, a driving mode of the corresponding area (a) is independently controlled regardless of a driving mode of another adjacent area (a) so that only a specific area of the screen is freely switched to any one of a wide-view mode and a narrow-view mode to selectively limit the viewing angle. Further, an area which is driven in the wide-view mode and the narrow-view mode may vary.

In the display apparatus 200 according to another exemplary embodiment of the present disclosure, the active area AA (see, e.g., FIG. 8) is divided into the plurality of areas (a) and a mode controller MC is disposed in each of the plurality of divided areas (a). Accordingly, the complex design of the driving IC is suppressed and the increased area of the flexible film COF and the non-active area NA is suppressed to minimize the bezel part of the display apparatus 100.

In the display apparatus 200 according to another exemplary embodiment of the present disclosure, the rising phenomenon of the low potential power may be suppressed. When the low potential power line is disposed only in the non-active area NA at the outer periphery of the display panel PN, the cathode of the light emitting diode is far from the low potential power line disposed in the non-active area NA of the outer periphery of the display panel PN. Therefore, a rising phenomenon that the voltage of a cathode rises due to the high resistance of the cathode may occur. However, in the display apparatus 200 according to another exemplary embodiment of the present disclosure, the plurality of non-pixel areas NPX in which the pixel PX is not disposed is disposed in the active area AA (see, e.g., FIG. 8) and the low potential power line VSSL is disposed in the column direction in the plurality of non-pixel areas NPX. Accordingly, the low potential power line VSSL is disposed to be adjacent to the pixel PX, thereby reducing the resistance. Further, by securing a supply path of the low potential power which transmits the low potential driving voltage to the cathode electrode, the rising phenomenon of the low potential power may be suppressed.

Figure 14:
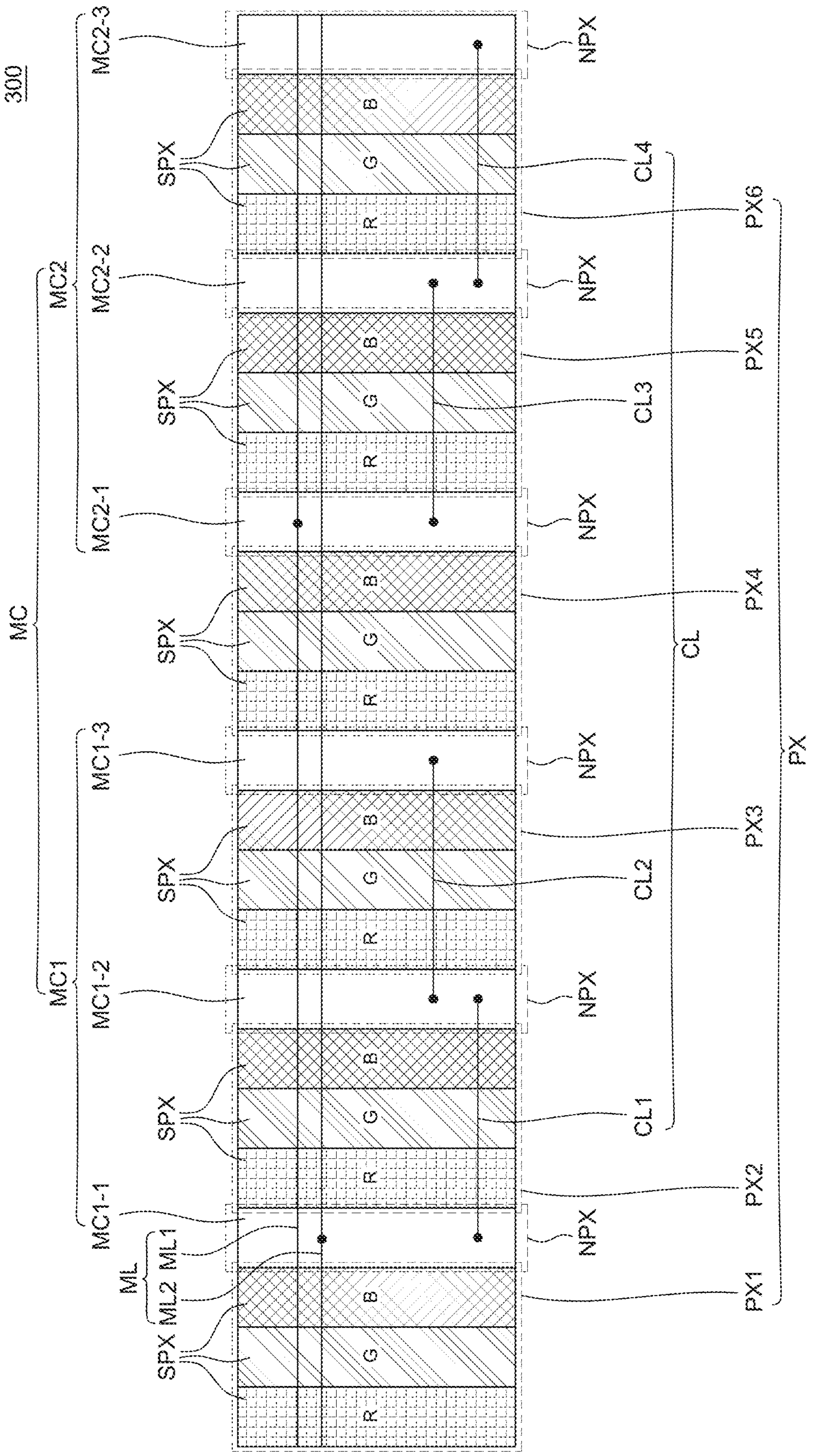
FIG. 14 is an enlarged plan view of a partial area of a display apparatus according to still another exemplary embodiment of the present disclosure.
Figure 15:
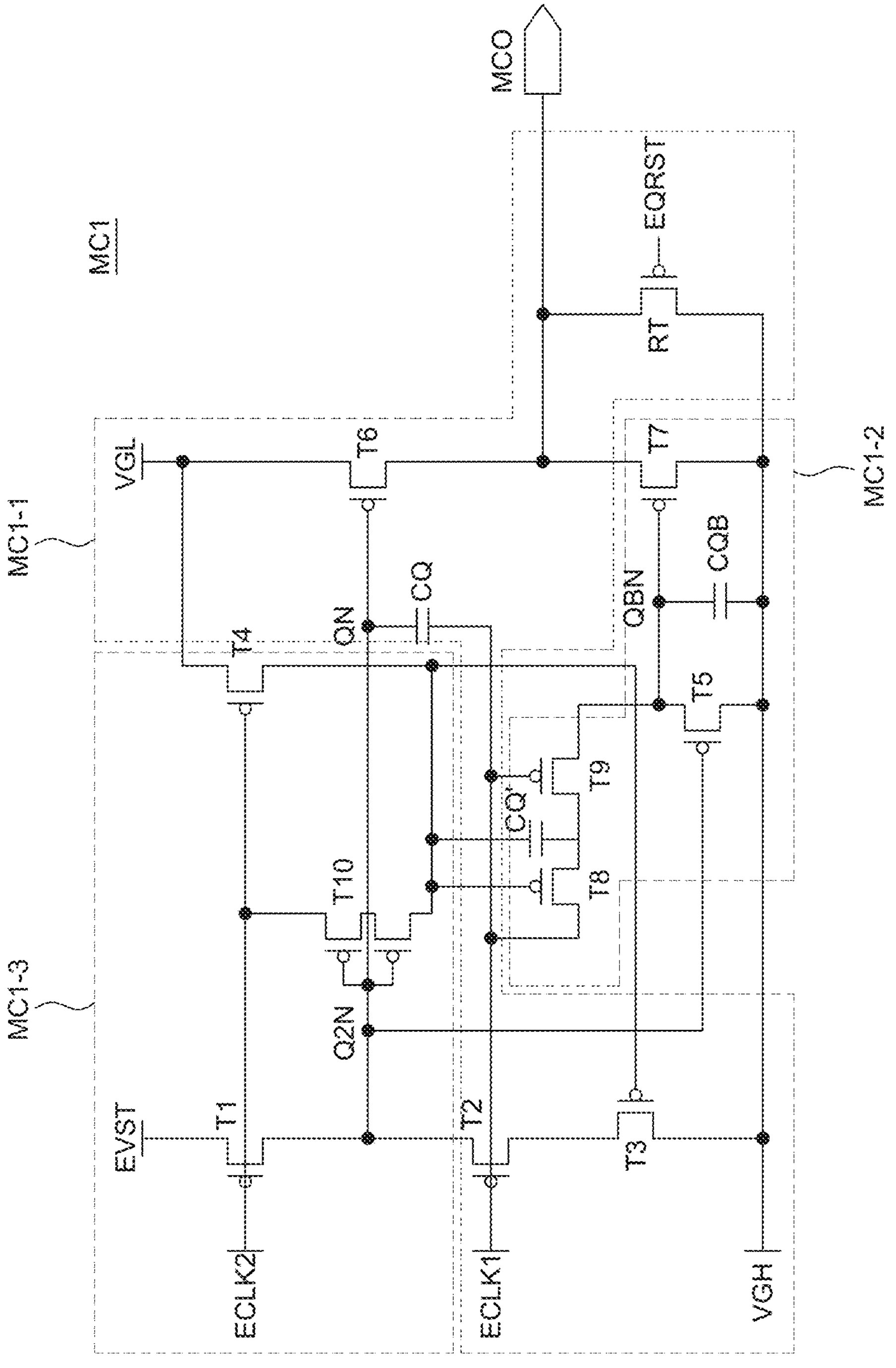
FIG. 15 is a circuit diagram of a mode controller of a display apparatus according to still another exemplary embodiment of the present disclosure.

FIG. 14 is an enlarged plan view of a partial area of a display apparatus according to still another exemplary embodiment of the present disclosure. FIG. 15 is a circuit diagram of a mode controller of a display apparatus according to still another exemplary embodiment of the present disclosure. A display apparatus 300 of FIGS. 14 and 15 is substantially the same as the display apparatus 100 of FIGS. 1 to 10 except the mode controller MC, so that a redundant description will be omitted. Even though in FIG. 15, for the convenience of description, a circuit of the first mode controller MC1 is described as an example, the second mode controller MC2 is configured with the same circuit as the first mode controller MC1, is divided and is driven.

Referring to FIG. 14, in the active area AA (see, e.g., FIG. 8), a mode controller MC which supplies a mode signal to the plurality of sub pixels SPX is disposed. The mode controller MC may supply mode signals Ss and Ps which control the driving mode of the display panel PN to a plurality of sub pixels SPX. For example, the mode controller MC includes a first mode controller MC1 which supplies the first mode signal Ss and a second mode controller MC2 which supplies the second mode signal Ps.

The first mode controller MC1 and the second mode controller MC2 are divided into a plurality of parts to be disposed for each area (a). For example, the first mode controller MC1 and the second mode controller MC2 are divided into three parts to be disposed for each area (a). For example, the first mode controller MC1 is divided into a 1-1-th mode controller MC1-1, a 1-2-th mode controller MC1-2, and a 1-3-th mode controller MC1-3 to be disposed in every area (a). The second mode controller MC2 is divided into a 2-1-th mode controller MC2-1, a 2-2-th mode controller MC2-2, and a 2-3-th mode controller MC2-3 to be disposed in every area (a).

Each area (a) (see, e.g., FIG. 8) includes a pixel PX and a non-pixel area NPX. The pixel PX includes a plurality of sub pixels SPX. The non-pixel area NPX may be disposed between adjacent pixels PX. The non-pixel area NPX may refer to an area in which the sub pixel SPX is not disposed.

The first mode controller MC1 and the second mode controller MC2 which are divided are disposed in the non-pixel area NPX between adjacent pixels PX. For example, each of the first mode controller MC1 and the second mode controller MC2 is divided into three. A 1-1-th mode controller MC1-1 is disposed in the non-pixel area between the first pixel PX1 and the second pixel PX2. A 1-2-th mode controller MC1-2 is disposed in the non-pixel area NPX between the second pixel PX2 and the third pixel PX3. A 1-3-th mode controller MC1-3 may be disposed in the non-pixel area between the third pixel PX3 and the fourth pixel PX4. The 2-1-th mode controller MC2-1 is disposed in the non-pixel area NPX between a fourth pixel PX4 and a fifth pixel PX5. The 2-2-th mode controller MC2-2 is disposed in the non-pixel area NPX between a fifth pixel PX5 and a sixth pixel PX6. The 2-3-th mode controller MC2-3 may be disposed in the non-pixel area NPX between a sixth pixel PX6 in the corresponding area (a) (see, e.g., FIG. 8) and a first pixel of an area adjacent to the corresponding area (a). However, the exemplary embodiment is not limited thereto and the divided first mode controller MC1 and second mode controller MC2 may be alternately disposed in the non-pixel area NPX between the pixel PX.

A mode signal line ML extending in the row direction is disposed in the plurality of areas (a). The mode signal line ML includes a first mode signal line ML1 and a second mode signal line ML2. The first mode signal line ML1 is connected to the 1-1 mode controller MC1-1 to which the first mode signal Ss is output, among the divided first mode controllers MC1, and transmits the first mode signal Ss supplied from the first mode controller MC1 to the plurality of sub pixels SPX. The second mode signal line ML2 is connected to the 2-1 mode controller MC2-1 to which the second mode signal Ps is output, among the divided second mode controllers MC2. The second mode signal line ML2 may transmit the second mode signal Ps supplied from the second mode controller MC2 to the plurality of sub pixels SPX. For example, the first mode signal line ML1 is connected to the 1-1-th mode controller MC1-1 to which the first mode signal Ss is output and the second mode signal line ML2 is connected to the 2-1-th mode controller MC2-1 to which the second mode signal Ps is output. The first mode signal line ML1 and the second mode signal line ML2 extend to the plurality of areas (a) (see, e.g., FIG. 8) in parallel in the row direction and transmit the first mode signal Ss and the second mode signal Ps to the plurality of sub pixels SPX included in one area (a).

In the plurality of areas (a), a plurality of connection lines CL which extends in the row direction and connects the divided first mode controller MC1 and second mode controller MC2 is disposed. The plurality of connection lines CL may transmit a signal between the divided first mode controller MC1 and the divided second mode controller MC2. For example, the connection line CL may include a first connection line CL1, a second connection line CL2, a third connection line CL3, and a fourth connection line CL4. The first connection line CL1 connects the 1-1-th mode controller MC1-1 and the 1-2-th mode controller MC1-2. The second connection line CL2 connects the 1-2-th mode controller MC1-2 and the 1-3-th mode controller MC1-3. The third connection line CL3 connects the 2-1-th mode controller MC2-1 and the 2-2-th mode controller MC2-2. The fourth connection line CL4 connects the 2-2-th mode controller MC2-2 and the 2-3-th mode controller MC2-3. For example, the first connection line CL1 and the second connection line CL2 may transmit a signal between the 1-1-th mode controller MC1-1, the 1-2-th mode controller MC1-2, and the 1-3-th mode controller MC1-3. Further, the third connection line CL3 and the fourth connection line CL4 may transmit a signal between the 2-1-th mode controller MC2-1, the 2-2-th mode controller MC2-2, and the 2-3-th mode controller MC2-3. The first connection line CL1 and the second connection line CL2 are referred to as a wide-view mode connection line and the third connection line CL3 and the fourth connection line CL4 may be referred to as a narrow-view mode connection line.

Referring to FIG. 15, the first mode controller MC1 is divided into three to be dispersed in the plurality of areas (a). For example, the 1-1-th mode controller MC1-1 may include the second transistor T2, the third transistor T3, the sixth transistor T6, and the first capacitor CQ. The 1-2-th mode controller MC1-2 may include the eighth transistor T8, the ninth transistor T9, the seventh transistor T7, the second capacitor CQB, and the third capacitor CQ'. The 1-3-th mode controller MC1-3 may include the first transistor T1, the fourth transistor T4, and the tenth transistor T10. However, the exemplary embodiment is not limited thereto and a number of divided first mode controllers MC1 and a placement position of each configuration may be changed depending on the design. Further, the second mode controller MC2 is configured with the same circuit as the first mode controller MC1 to be divided in the same way to be dispersed in the plurality of areas (a).

In the display apparatus 300 according to still another exemplary embodiment of the present disclosure, the active area AA (see, e.g., FIG. 8) is divided into the plurality of areas (a) and a mode controller MC is disposed in each of the plurality of divided areas (a). Accordingly, a driving mode of the corresponding area (a) is independently controlled regardless of a driving mode of another adjacent area (a) so that only a specific area of the screen is freely switched to any one of a wide-view mode and a narrow-view mode to selectively limit the viewing angle. Further, an area which is driven in the wide-view mode and the narrow-view mode may vary.

In the display apparatus 300 according to still another exemplary embodiment of the present disclosure, the active area AA (see, e.g., FIG. 8) is divided into the plurality of areas (a) and a mode controller MC is disposed in each of the plurality of divided areas. Accordingly, the complex design of the driving IC is suppressed and the increased area of the flexible film COF and the non-active area NA is suppressed to minimize the bezel part of the display apparatus 100.

In the display apparatus 300 according to still another exemplary embodiment of the present disclosure, the plurality of divided mode controllers MC is dispersed in the active area AA (see, e.g., FIG. 8) so that the luminance uniformity for every position in the active area AA (see, e.g., FIG. 8) may be improved. When the mode controller MC is disposed only in one non-pixel area NPX, among the plurality of non-pixel areas NPX of the active area AA (see, e.g., FIG. 8), an area of only the corresponding non-pixel area NPX is increased so that a size of the pixel PX adjacent to the corresponding non-pixel area NPX is reduced. Therefore, there is a problem in that the luminance is lowered. Further, when the mode controller MC is disposed only in one non-pixel area NPX, among the plurality of non-pixel areas NPX of the active area AA (see, e.g., FIG. 8), a size of the corresponding non-pixel area needs to be larger than a size of the other non-pixel area so that there is a problem in that the uniformity of the pixel placement is lowered. Accordingly, in the display apparatus 300 according to still another exemplary embodiment of the present disclosure, a plurality of divided mode controllers MC is disposed in each of the plurality of non-pixel areas NPX so that the increase in the area of only a part of non-pixel areas NPX in the active area AA (see, e.g., FIG. 8) is suppressed. By doing this, the luminance uniformity for every position in the active area AA (see, e.g., FIG. 8) may be improved.

Figure 16:
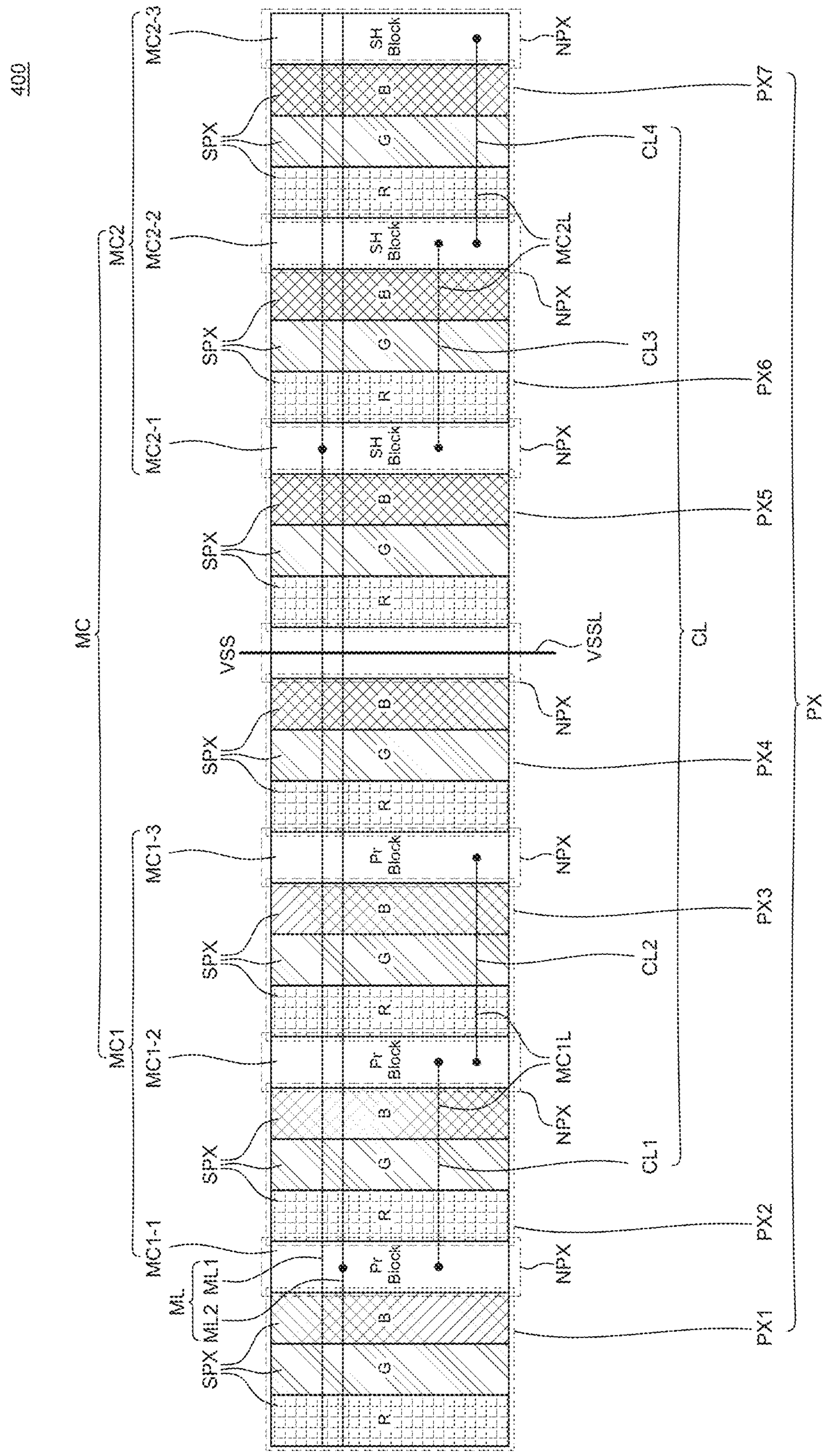
FIG. 16 is an enlarged plan view of a partial area of a display apparatus according to still another exemplary embodiment of the present disclosure.

FIG. 16 is an enlarged plan view of a partial area of a display apparatus according to still another exemplary embodiment of the present disclosure. A display apparatus 400 of FIG. 16 and the display apparatus 300 of FIGS. 14 and 15 have the substantially same configuration except a low potential power line VSSL, so that a redundant description will be omitted.

Referring to FIG. 16, the first mode controller MC1 and the second mode controller MC2 are disposed in the non-pixel area NPX. For example, when one area includes six pixels PX, a 1-1-th mode controller MC1-1 is disposed in the non-pixel area between the first pixel PX1 and the second pixel PX2. A 1-2-th mode controller MC1-2 is disposed in the non-pixel area NPX between the second pixel PX2 and the third pixel PX3. A 1-3-th mode controller MC1-3 may be disposed in the non-pixel area between the third pixel PX3 and the fourth pixel PX4. The 2-1-th mode controller MC2-1 is disposed in the non-pixel area NPX between a fourth pixel PX4 and a fifth pixel PX5. The 2-2-th mode controller MC2-2 is disposed in the non-pixel area NPX between a fifth pixel PX5 and a sixth pixel PX6. The 2-3-th mode controller MC2-3 may be disposed in the non-pixel area NPX between a sixth pixel PX6 in the corresponding area and a first pixel of an area adjacent to the corresponding area. However, the exemplary embodiment is not limited thereto and the divided first mode controller MC1 and second mode controller MC2 may be alternately disposed between the pixels PX.

In the plurality of areas (a), a plurality of connection lines CL which extends in the row direction and connects the divided first mode controller MC1 and second mode controller MC2 is disposed. The plurality of connection lines CL may transmit a signal between the divided first mode controller MC1 and the divided second mode controller MC2. For example, the connection line CL may include a first connection line CL1, a second connection line CL2, a third connection line CL3, and a fourth connection line CL4. The first connection line CL1 connects the 1-1-th mode controller MC1-1 and the 1-2-th mode controller MC1-2. The second connection line CL2 connects the 1-2-th mode controller MC1-2 and the 1-3-th mode controller MC1-3. The third connection line CL3 connects the 2-1-th mode controller MC2-1 and the 2-2-th mode controller MC2-2. The fourth connection line CL4 connects the 2-2-th mode controller MC2-2 and the 2-3-th mode controller MC2-3. For example, the first connection line CL1 and the second connection line CL2 may transmit a signal between the 1-1-th mode controller MC1-1, the 1-2-th mode controller MC1-2, and the 1-3-th mode controller MC1-3. Further, the third connection line CL3 and the fourth connection line CL4 may transmit a signal between the 2-1-th mode controller MC2-1, the 2-2-th mode controller MC2-2, and the 2-3-th mode controller MC2-3. The first connection line CL1 and the second connection line CL2 are referred to as a wide-view mode connection line. The third connection line CL3 and the fourth connection line CL4 may be referred to as a narrow-view mode connection line.

In a remaining non-pixel area NPX in which the first mode controller MC1 and the second mode controller MC2 are not disposed, a power line is disposed. For example, the power line may be a low potential power line VSSL. The low potential power line VSSL is disposed in the remaining non-pixel area NPX in which the first mode controller MC1 and the second mode controller MC2 are not disposed, in the column direction. For example, the low potential power line VSSL may be disposed in the non-pixel area NPX between the fourth pixel PX4 and the fifth pixel PX5 in the column direction. The low potential power line VSSL is connected to the cathode electrode of the plurality of sub pixels SPX included in the corresponding area to apply a low potential power.

In the display apparatus 400 according to still another exemplary embodiment of the present disclosure, the active area AA (see, e.g., FIG. 8) is divided into the plurality of areas (a) and a mode controller MC is disposed in each of the plurality of divided areas (a). Accordingly, a driving mode of the corresponding area (a) is independently controlled regardless of a driving mode of another adjacent area (a) so that only a specific area of the screen is freely switched to any one of a wide-view mode and a narrow-view mode to selectively limit the viewing angle. Further, an area which is driven in the wide-view mode and the narrow-view mode may vary.

In the display apparatus 400 according to still another exemplary embodiment of the present disclosure, the active area AA (see, e.g., FIG. 8) is divided into the plurality of areas (a) and a mode controller MC is disposed in each of the plurality of divided areas. Accordingly, the complex design of the driving IC is suppressed and the increased area of the flexible film COF and the non-active area NA is suppressed to minimize the bezel part of the display apparatus 100.

In the display apparatus 400 according to still another exemplary embodiment of the present disclosure, a plurality of divided mode controllers MC is disposed in each of the plurality of non-pixel areas NPX so that the increase in the area of only a part of non-pixel areas NPX in the active area AA (see, e.g., FIG. 8) is suppressed. By doing this, the luminance uniformity for every position in the active area AA (see, e.g., FIG. 8) may be improved.

In the display apparatus 400 according to still another exemplary embodiment of the present disclosure, the low potential power line VSSL is disposed in the non-pixel area NPX in which the mode controller MC is not disposed, among a plurality of non-pixel areas NPX in which a pixel PX is not disposed, in the column direction. Therefore, the low potential power line VSSL is disposed to be adjacent to the pixel PX to reduce a resistance and a supply path of the low potential power to transmit a low potential driving voltage to the cathode electrode is further ensured to suppress the rising phenomenon of the low potential power.

Figure 17:
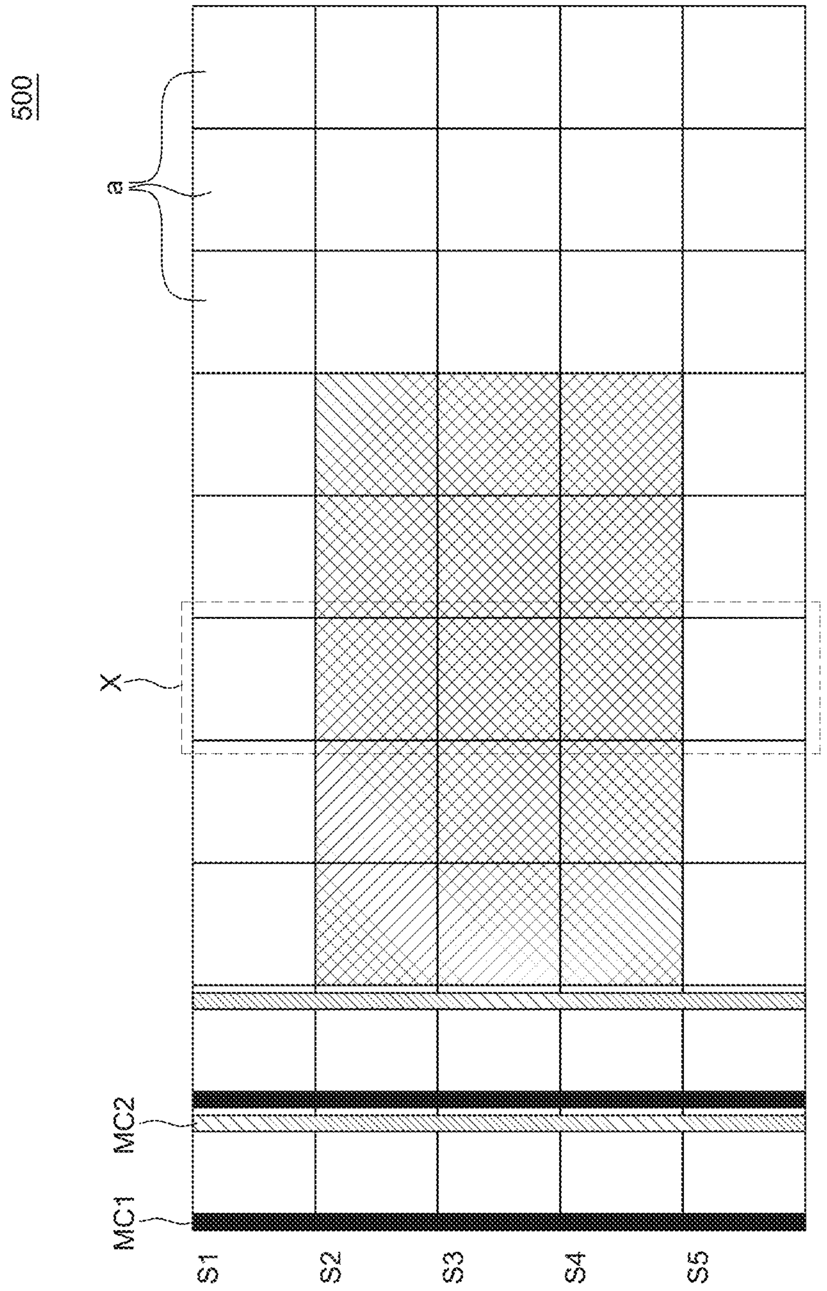
FIG. 17 is a schematic plan view of a display apparatus according to still another exemplary embodiment of the present disclosure.
Figure 18:
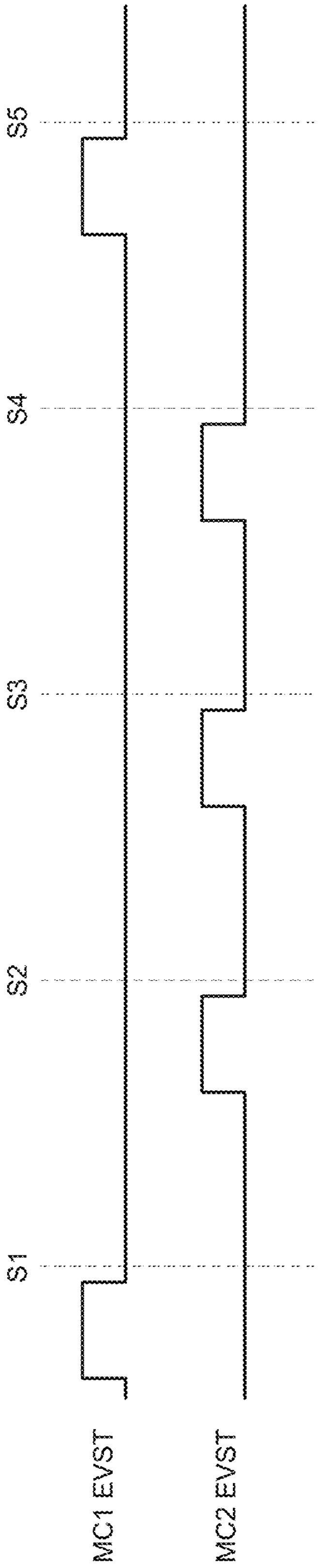
FIG. 18 is a waveform diagram illustrating a start signal which is applied to a mode controller of a display apparatus according to still another exemplary embodiment of the present disclosure.

FIG. 17 is a schematic plan view of a display apparatus according to still another exemplary embodiment of the present disclosure. FIG. 18 is a waveform diagram illustrating a start signal which is applied to a mode controller of a display apparatus according to still another exemplary embodiment of the present disclosure. Even though in FIG. 17, for the convenience of description, it is illustrated that the first mode controller MC1 and the second mode controller MC2 are disposed in a partial area, the first mode controller MC1 and the second mode controller MC2 are disposed in the other area of the active area AA (see, e.g., FIG. 8). At this time, in FIG. 17, an area (a) with a hatching is driven in a second mode and an area (a) without hatching is driven in a first mode. FIG. 18 is a waveform diagram illustrating a start signal which is applied to the first mode controller MC1 and the second mode controller MC2 in the area X.

Referring to FIG. 17, the active area AA (see, e.g., FIG. 8) of the display panel PN includes a plurality of areas (a) which is divided in a matrix. The plurality of areas (a) may be areas of pixels PX to which the same mode signal is applied. In the meantime, in FIG. 17, it is illustrated that the active area AA (see, e.g., FIG. 8) is divided into five in the column direction and 10 in the row direction to be divided into a total of 50 areas (a), but the exemplary embodiment is not limited thereto.

A partial area (a) (see, e.g., FIG. 8) of the plurality of areas (a) operates in the first mode and the remaining area (a) may operate in the second mode. For example, among 50 areas (a), 15 areas (a) in the center are driven in the second mode and the remaining 35 areas (a) are driven in the first mode.

The plurality of areas (a) (see, e.g., FIG. 8) may be driven in the first mode or the second mode according to the mode signal supplied from the mode controller MC included in the corresponding area (a). The mode controller MC included in the corresponding area (a) may output a mode signal to allow the corresponding area (a) to be driven in the first mode or the second mode according to the input start signal EVST. The mode controller MC may output a mode signal to select a mode of a corresponding period according to the start signal EVST which is input immediately before the corresponding timing.

Referring to FIG. 18, when a high level of start signal EVST is input to the first mode controller MC1 and a low level of start signal EVST is input to the second mode controller MC2 immediately before a first timing S1, an area (a) (see, e.g., FIG. 8) corresponding to a first row of the area X may operate in the first mode. When a low level of start signal EVST is input to the first mode controller MC1 and a high level of start signal EVST is input to the second mode controller MC2 immediately before a second timing S2, an area (a) corresponding to a second row of the area X may operate in the second mode. When a low level of start signal EVST is input to the first mode controller MC1 and a high level of start signal EVST is input to the second mode controller MC2 immediately before a third timing S3, an area (a) corresponding to a third row of the area X may operate in the second mode. When a low level of start signal EVST is input to the first mode controller MC1 and a high level of start signal EVST is input to the second mode controller MC2 immediately before a fourth timing S4, an area (a) corresponding to a fourth row of the area X may operate in the second mode. When a high level of start signal EVST is input to the first mode controller MC1 and a low level of start signal EVST is input to the second mode controller MC2 immediately before a fifth timing S5, an area (a) corresponding to a fifth row of the area X may operate in the first mode.

Accordingly, in the display apparatus 500 according to still another exemplary embodiment of the present disclosure, the active area AA (see, e.g., FIG. 8) is divided into the plurality of areas (a) and a mode controller MC is disposed in each of the plurality of divided areas (a). Accordingly, a driving mode of the corresponding area (a) is independently controlled regardless of a driving mode of another adjacent area (a) so that only a specific area of the screen is freely switched to any one of a wide-view mode and a narrow-view mode to selectively limit the viewing angle. Further, an area which is driven in the wide-view mode and the narrow-view mode may vary.

In the display apparatus 500 according to still another exemplary embodiment of the present disclosure, the active area AA (see, e.g., FIG. 8) is divided into the plurality of areas (a) and a mode controller MC is disposed in each of the plurality of divided areas. Accordingly, the complex design of the driving IC is suppressed and the increased area of the flexible film COF and the non-active area NA is suppressed to minimize the bezel part of the display apparatus 100.

In the display apparatus 500 according to still another exemplary embodiment of the present disclosure, the narrow-view mode and the wide-view mode are independently driven for the active area which is divided into a plurality of areas (a) (see, e.g., FIG. 8) to selectively limit the viewing angle for every area (a) of the active area. Further, the active area which is driven in the wide-view mode and the narrow-view mode varies. When active areas which are driven in the wide-view mode and the narrow-view mode are separately confirmed in the display panel, the display panel may be used by dividing the area (a) according to a predetermined mode. Accordingly, in the display apparatus 500 according to still another exemplary embodiment of the present disclosure, the active area is divided in the plurality of areas (a) in a matrix and the plurality of areas (a) may change a driving mode according to a start signal EVST supplied to the mode controller MC. Accordingly, in the display apparatus 500 according to still another exemplary embodiment of the present disclosure, the narrow-view mode and the wide-view mode are independently driven for the active area which is divided into a plurality of areas (a) to selectively limit the viewing angle in each of the plurality of areas (a). Further, the active area which is driven in the wide-view mode and the narrow-view mode may vary.

A display apparatus according to the exemplary embodiments of the present disclosure can also be described as follows:

A display apparatus according to an exemplary embodiment of the present disclosure includes a display panel including an active area in which a plurality of pixels including a plurality of sub pixels is disposed and a non-active area disposed so as to enclose the active area and a mode controller disposed in the active area and supplies a mode signal to the plurality of sub pixels, wherein each of the plurality of sub pixels includes a first light emitting diode, a first lens which refracts light from the first light emitting diode, a second light emitting diode which emits the same color light as the first light emitting diode and a second lens which refracts light from the second light emitting diode and has a shape different from that of the first lens.

The mode controller may include a plurality of first mode controllers which supplies a first mode signal and a plurality of second mode controllers which supplies a second mode signal, the active area includes a plurality of areas divided in a row direction, and the plurality of first mode controllers and the plurality of second mode controllers are disposed one by one for each of the plurality of areas.

The first mode controller and the second mode controller may be divided into plurality of parts to be disposed between the plurality of sub pixels.

The display apparatus may further include a power line disposed in an area excluding an area in which the plurality of first mode controllers and the plurality of second mode controllers are disposed, of an area between the plurality of sub pixels.

The display apparatus may further include a first mode signal line which extends to a row direction in the plurality of areas to transmit the first mode signal to the plurality of sub pixels and a second mode signal line which extends to the row direction in the plurality of areas to transmit the second mode signal to the plurality of sub pixels.

The display apparatus may further include a connection line which connects the divided first mode controller and the divided second mode controller, respectively.

The active area may include a plurality of areas divided in a matrix and the mode controller controls each of the plurality of areas to be driven in any one of a first mode or a second mode.

Each of the plurality of sub pixels is driven in any one of the first mode or the second mode and in the first mode, the first light emitting diode emits light so that light from the first light emitting diode may be output by the first lens with a limited viewing angle to a first direction and a second direction and in the second mode, the second light emitting diode emits light so that light from the second light emitting diode is output by the second lens with a limited viewing angle only to the first direction.

Each of the plurality of sub pixels may further include a driving transistor, a first emission control transistor connected between the driving transistor and the first light emitting diode and a second emission control transistor connected between the driving transistor and the second light emitting diode, and in the first mode, the first emission control transistor is turned on and the second emission control transistor is turned off and in the second mode, the first emission control transistor is turned off and the second emission control transistor is turned on.

A display apparatus according to another exemplary embodiment of the present disclosure include a display panel including an active area divided into a plurality of areas and a non-active area, a plurality of sub pixels disposed in the active area to be driven in a wide-view mode or a narrow-view mode and a mode controller disposed in the active area and includes a wide-view mode controller providing a wide-view mode signal to the plurality of sub pixels and a narrow-view mode controller providing a narrow-view mode signal.

The active area may include a plurality of areas divided in a row direction and the wide-view mode controller and the narrow-view mode controller may be disposed one by one for each of the plurality of areas.

The wide-view mode controller and the narrow-view mode controller may be each divided into a plurality of parts to be dispersed in the plurality of areas.

The plurality of areas may include a pixel including the plurality of sub pixels and a non-pixel area other than the area in which the pixel is disposed and may further include a power line disposed in the non-pixel area.

The display apparatus may further include a wide-view mode signal line which extends in a row direction in the plurality of areas and is connected to the wide-view mode controller to transmit the wide-view mode signal to the plurality of sub pixels and a narrow-view mode signal line which extends in a row direction in the plurality of areas and is connected to the narrow-view mode controller to transmit the narrow-view mode signal to the plurality of sub pixels.

The display apparatus may further include a wide-view mode connection line which connects the plurality of divided wide-view mode controllers and a narrow-view mode connection line which connects the plurality of divided narrow-view mode controllers.

The active area may include a plurality of areas divided in a matrix and the mode controller independently controls each of the plurality of areas to be driven in any one of a wide-view mode or a narrow-view mode.

Each of the plurality of sub pixels may include a first light emitting diode which emits light by a driving current, a second light emitting diode which emits light by the driving current, a driving transistor which controls the driving currents, a first emission control transistor connected between the driving transistor and the first light emitting diode and is turned on to transmit the driving current to the first light emitting diode and a second emission control transistor connected between the driving transistor and the second light emitting diode and is turned on to transmit the driving current to the second light emitting diode.

Each of the plurality of sub pixels may further include a first lens disposed on the first light emitting diode to refract light emitted from the first light emitting diode so that the viewing angle is limited to a first direction and a second direction and a second lens disposed on the second light emitting diode to refract light emitted from the second light emitting diode so that the viewing angle is limited only to the first direction.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:

a display panel including an active area in which a plurality of pixels including a plurality of sub pixels is disposed and a non-active area disposed so as to enclose the active area; and a mode controller which is disposed in the active area and which supplies a mode signal to the plurality of sub pixels, wherein each of the plurality of sub pixels includes:

a first light emitting diode;

a first lens which refracts light from the first light emitting diode;

a second light emitting diode which emits a same color light as the first light emitting diode; and a second lens which refracts light from the second light emitting diode and has a shape different from a shape of the first lens.

2. The display apparatus according to claim 1, wherein the mode controller includes:

a plurality of first mode controllers which supplies a first mode signal; and a plurality of second mode controllers which supplies a second mode signal, wherein the active area includes a plurality of areas divided in a row direction, and the plurality of first mode controllers and the plurality of second mode controllers are disposed one by one for each of the plurality of areas.

3. The display apparatus according to claim 2, wherein the first mode controllers and the second mode controllers are divided into a plurality of parts disposed between the plurality of sub pixels.

4. The display apparatus according to claim 3, further comprising:

a power line disposed in an area between the plurality of sub pixels excluding an area in which the plurality of first mode controllers and the plurality of second mode controllers are disposed.

5. The display apparatus according to claim 4, further comprising:

a first mode signal line which extends in a row direction in the plurality of areas and which transmits the first mode signal to the plurality of sub pixels; and a second mode signal line which extends in the row direction in the plurality of areas and which transmits the second mode signal to the plurality of sub pixels.

6. The display apparatus according to claim 5, further comprising:

a connection line which connects the first mode controllers and the second mode controllers, respectively.

7. The display apparatus according to claim 1, wherein the active area includes a plurality of areas divided in a matrix and the mode controller controls driving of each of the plurality of areas in any one of a first mode or a second mode.

8. The display apparatus according to claim 1, wherein each of the plurality of sub pixels is driven in any one of a first mode or a second mode, wherein, in the first mode, the first light emitting diode emits light so that light from the first light emitting diode is output by the first lens with a first viewing angle limited to a first direction and a second direction, and wherein, in the second mode, the second light emitting diode emits light so that light from the second light emitting diode is output by the second lens with a second viewing angle limited to only the first direction.

9. The display apparatus according to claim 8, wherein each of the plurality of sub pixels further includes:

a driving transistor;

a first emission control transistor connected between the driving transistor and the first light emitting diode; and a second emission control transistor connected between the driving transistor and the second light emitting diode, wherein, in the first mode, the first emission control transistor is turned on and the second emission control transistor is turned off, and wherein, in the second mode, the first emission control transistor is turned off and the second emission control transistor is turned on.

10. A display apparatus, comprising:

a display panel including an active area divided into a plurality of areas, and a non-active area;

a plurality of sub pixels disposed in the active area and driven in a wide-view mode or a narrow-view mode; and a mode controller disposed in the active area and including a wide-view mode controller providing a wide-view mode signal to the plurality of sub pixels, and a narrow-view mode controller providing a narrow-view mode signal.

11. The display apparatus according to claim 10, wherein the active area includes a plurality of areas divided in a row direction, and the wide-view mode controller and the narrow-view mode controller are disposed one by one for each of the plurality of areas.

12. The display apparatus according to claim 11, wherein the wide-view mode controller and the narrow-view mode controller are each divided into a plurality of parts dispersed in the plurality of areas.

13. The display apparatus according to claim 12, wherein the plurality of areas includes a pixel including the plurality of sub pixels, and a non-pixel area other than an area in which the pixel is disposed and which includes a power line.

14. The display apparatus according to claim 13, further comprising:

a wide-view mode signal line which extends in a row direction in the plurality of areas and is connected to the wide-view mode controller and transmits the wide-view mode signal to the plurality of sub pixels; and a narrow-view mode signal line which extends in the row direction in the plurality of areas and is connected to the narrow-view mode controller and transmits the narrow-view mode signal to the plurality of sub pixels.

15. The display apparatus according to claim 14, further comprising:

a wide-view mode connection line which connects the plurality of parts of the wide-view mode controller; and a narrow-view mode connection line which connects the plurality of parts of the narrow-view mode controller.

16. The display apparatus according to claim 10, wherein the active area includes a plurality of areas divided in a matrix, and the mode controller independently controls driving of each of the plurality of areas in any one of a wide-view mode or a narrow-view mode.

17. The display apparatus according to claim 10, wherein each of the plurality of sub pixels includes:

a first light emitting diode which emits light by a driving current;

a second light emitting diode which emits light by the driving current;

a driving transistor which controls the driving current;

a first emission control transistor which is connected between the driving transistor and the first light emitting diode and which is turned on to transmit the driving current to the first light emitting diode; and a second emission control transistor which is connected between the driving transistor and the second light emitting diode and which is turned on to transmit the driving current to the second light emitting diode.

18. The display apparatus according to claim 17, wherein each of the plurality of sub pixels further includes:

a first lens disposed on the first light emitting diode which refracts light emitted from the first light emitting diode so that a first viewing angle is limited to a first direction and a second direction; and a second lens disposed on the second light emitting diode which refracts light emitted from the second light emitting diode so that a second viewing angle is limited to only the first direction.

* * * * *